United States Patent [19]
van der Lely

[11] 4,126,185
[45] Nov. 21, 1978

[54] SOIL CULTIVATING IMPLEMENT

[76] Inventor: Cornelis van der Lely, 7, Brüschenrain, ZUG, Switzerland

[21] Appl. No.: 722,511

[22] Filed: Sep. 13, 1976

[30] Foreign Application Priority Data

Sep. 12, 1975 [NL] Netherlands .......................... 7510741
May 3, 1976 [NL] Netherlands .......................... 7604670

[51] Int. Cl.² ............................................. A01B 33/06
[52] U.S. Cl. ......................................... 172/59; 172/70
[58] Field of Search ...................... 172/59, 65, 63, 49, 172/111, 73

[56] References Cited

U.S. PATENT DOCUMENTS

| 3,946,816 | 3/1976 | Lely | 172/65 |
| 4,003,437 | 1/1977 | Lely | 172/59 |

FOREIGN PATENT DOCUMENTS

| 479,538 | 7/1929 | Fed. Rep. of Germany | 172/59 |
| 502,839 | 7/1930 | Fed. Rep. of Germany | 172/59 |
| 6,807,548 | 12/1969 | Netherlands | 172/59 |

Primary Examiner—Richard J. Johnson
Attorney, Agent, or Firm—Mason, Mason & Albright

[57] ABSTRACT

An implement has a row of soil working or cultivating members that are driven to rotate about upwardly extending axes. Adjacent cultivating members are rotated in relative opposite directions to work overlapping circular paths and depend from an elongated frame portion that extends transverse to the direction of travel. Between neighboring cultivating members, soil crumbling members are positioned to work the top soil adjacent the overlapping paths defined by tines of the cultivating members. Each cultivating member includes a substantially horizontal support with tines depending from that support. The crumbling members extend from a forward supporting structure, rearwardly to free ends that normally are located above or adjacent the cultivating member supports, but below the frame portion. The crumbling members are resilient and/or spring mounted and can be used in combination with forward soil working elements that also extend rearwardly to the ground during operation.

11 Claims, 20 Drawing Figures

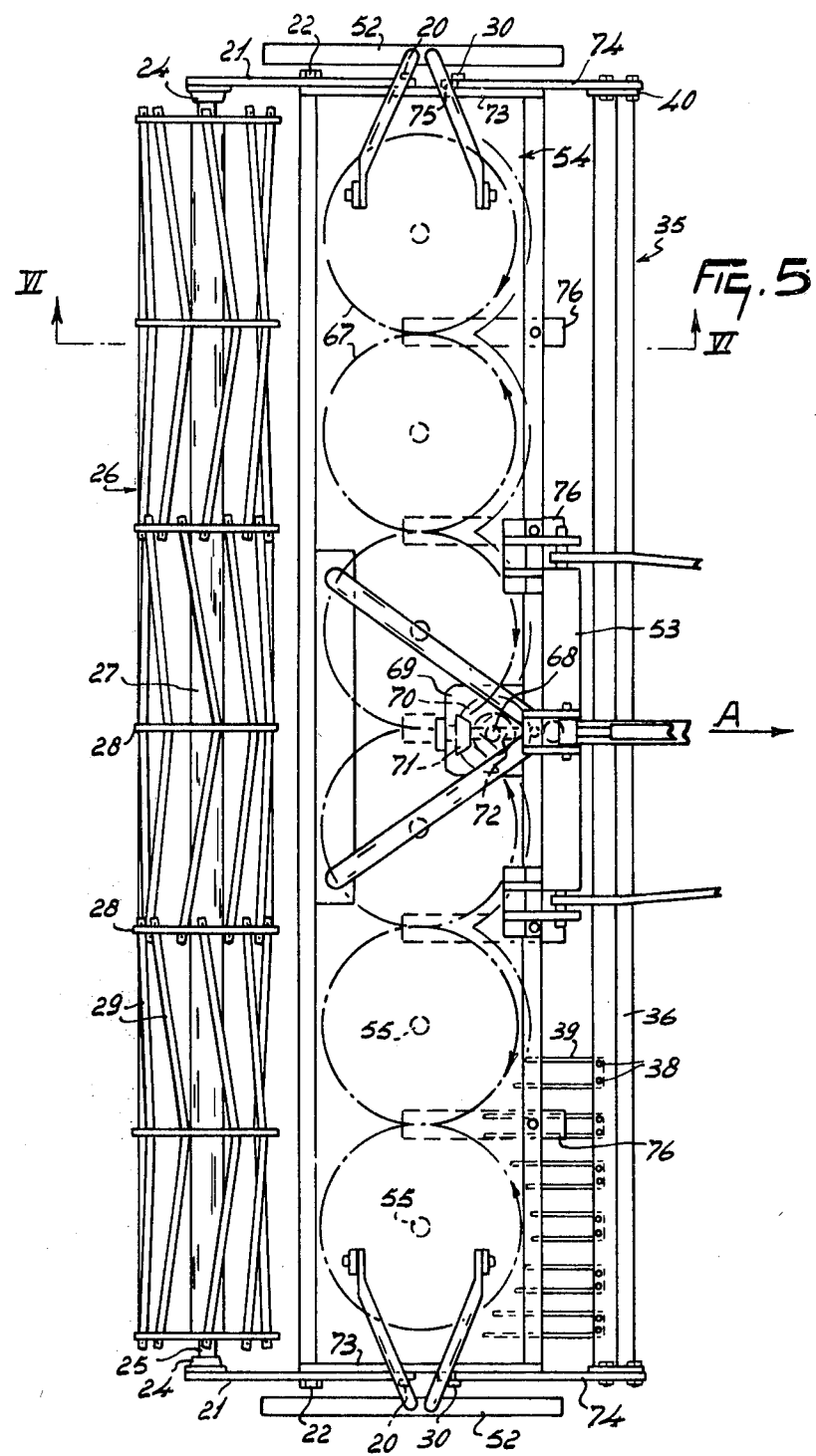

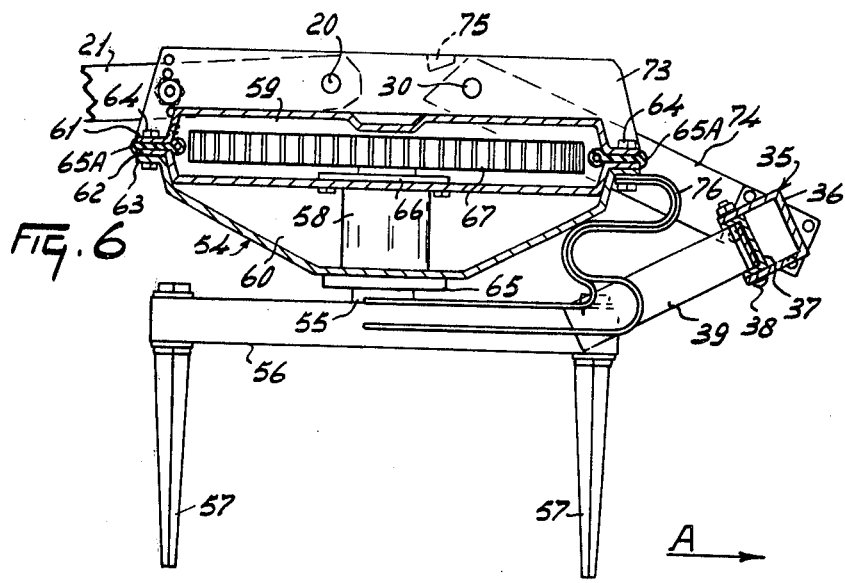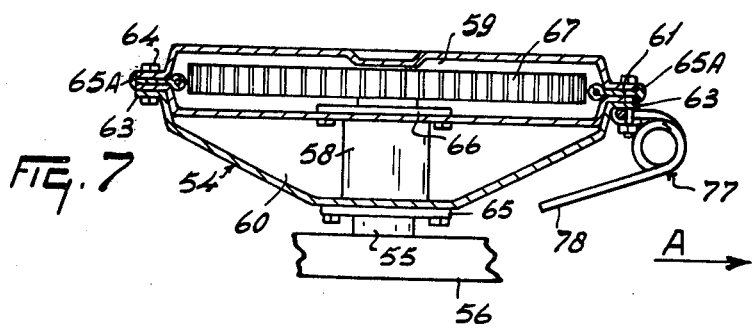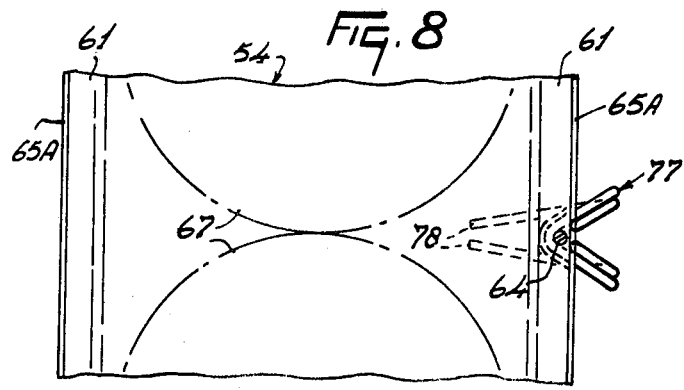

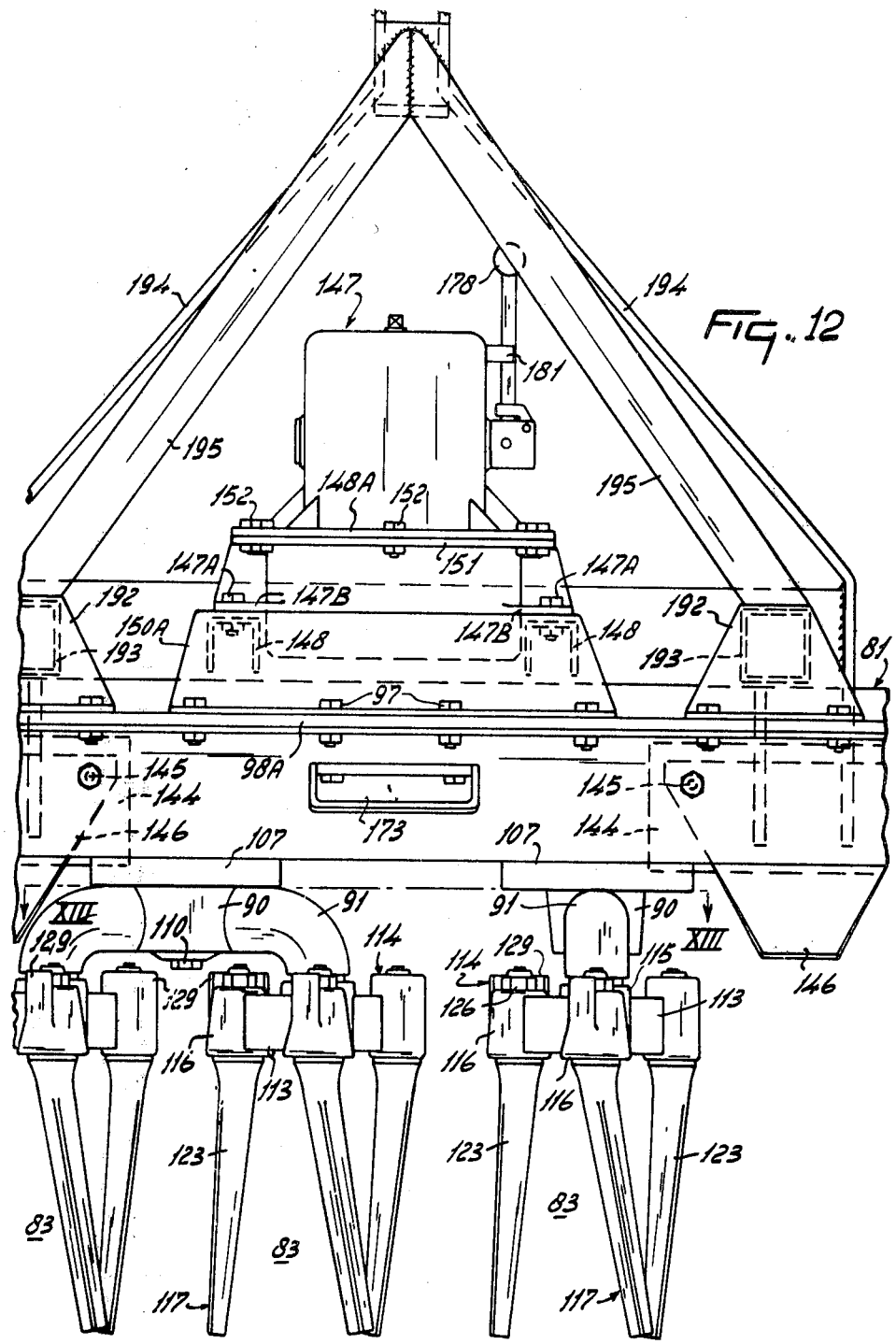

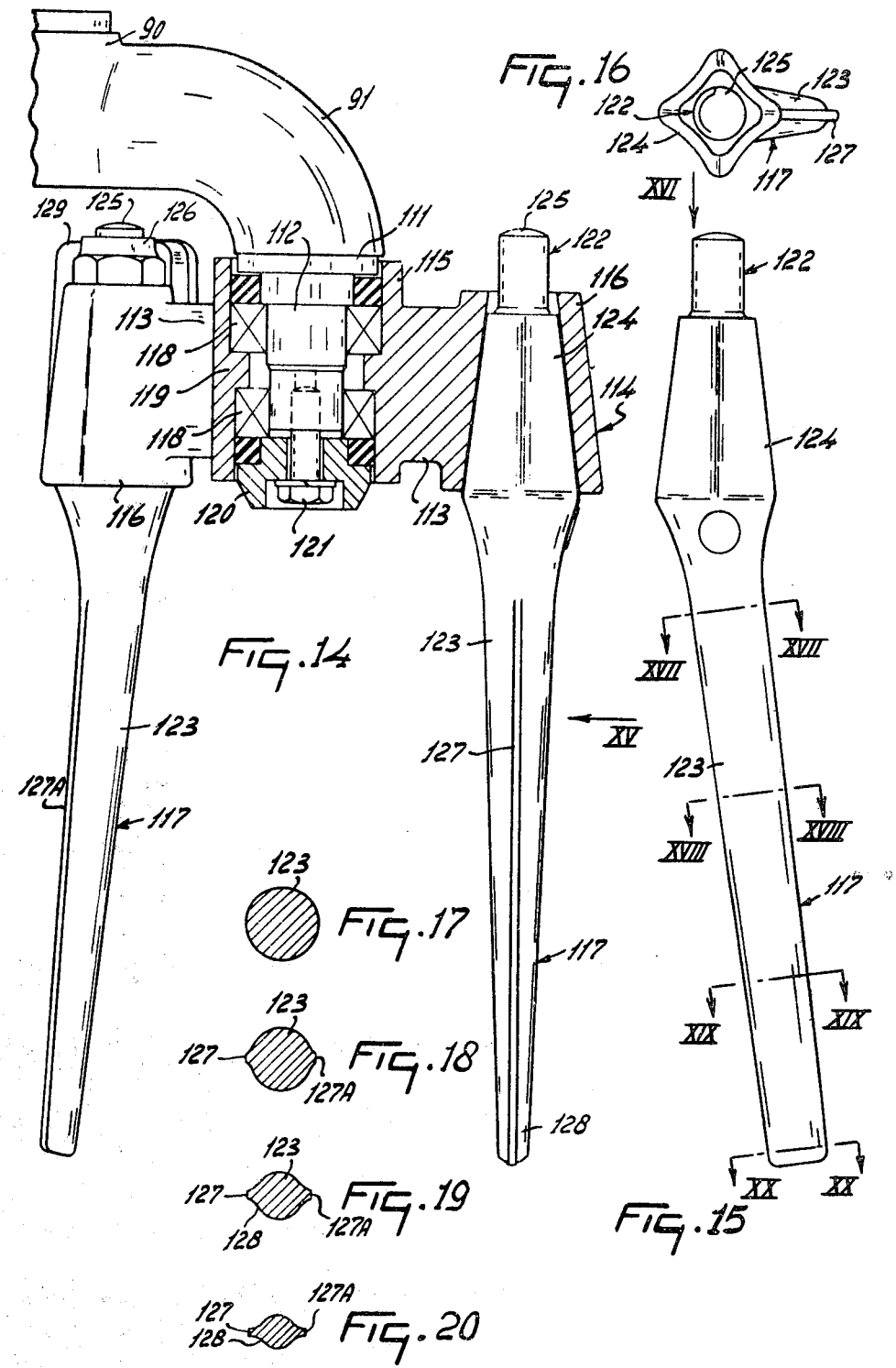

SOIL CULTIVATING IMPLEMENT

The invention relates to a soil cultivating implement comprising a plurality of cultivating members adapted to rotate about upwardly extending axes.

In accordance with the invention the implement of the kind set forth comprises a crumbling member cooperating with the top sides of the cultivating members for crumbling up the earth between two cultivating members that is arranged at least partly above the paths described by said cultivating members.

Figure 1:
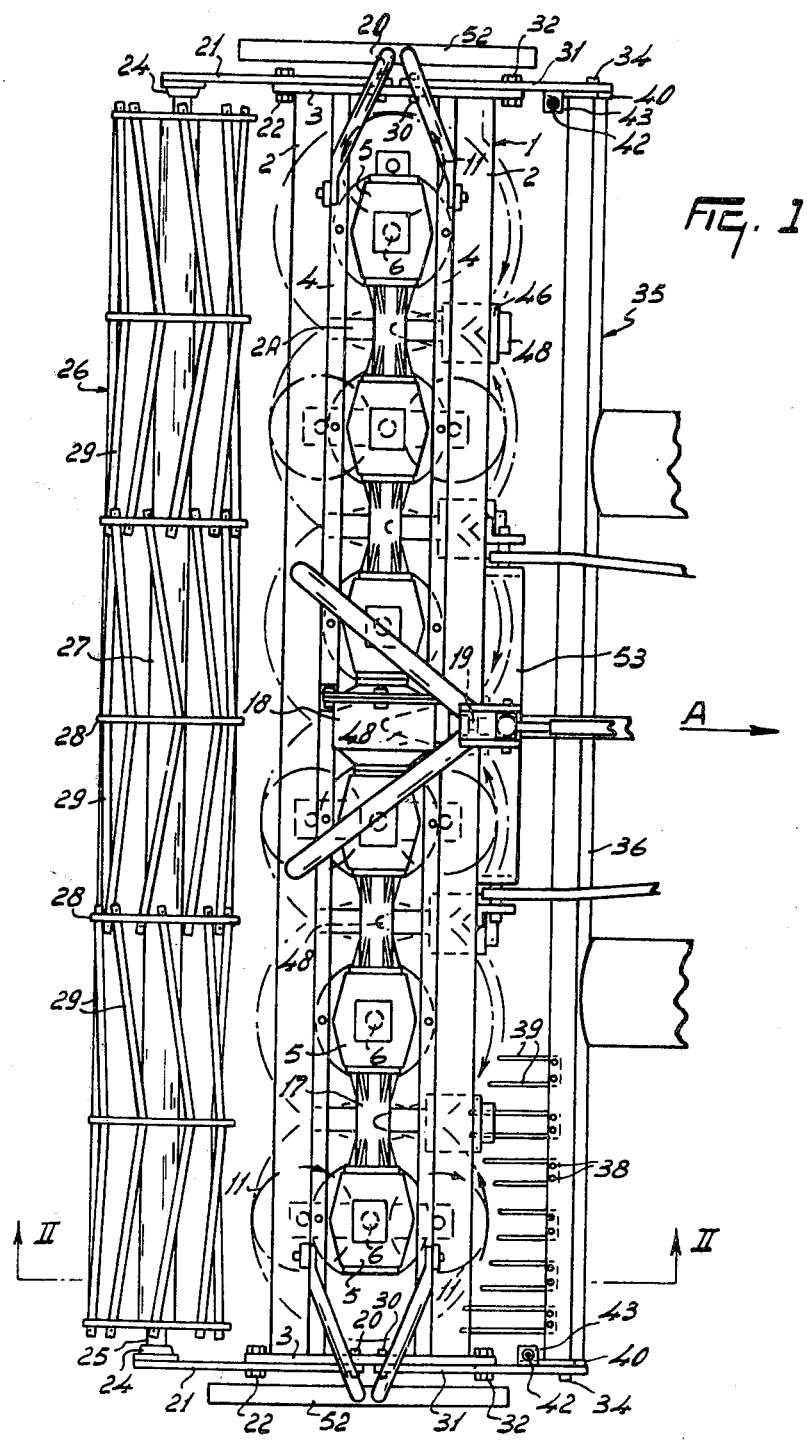
Figure 2:
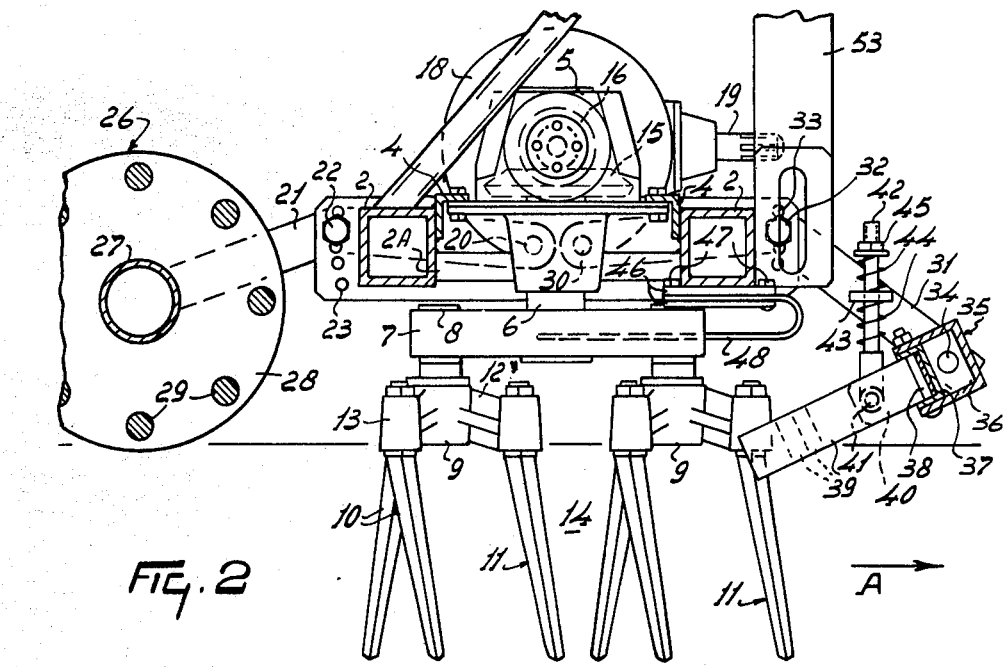
Figure 3:
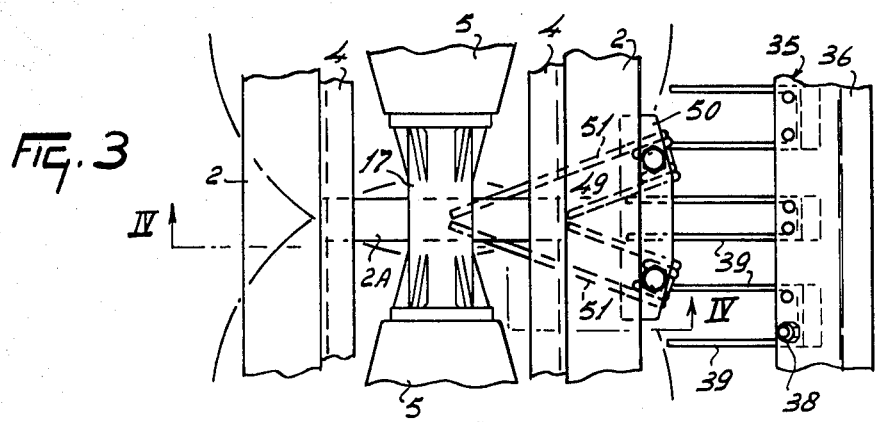
Figure 4:
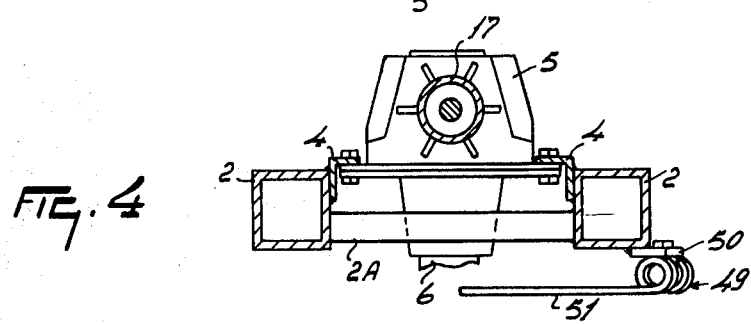
Figure 9:
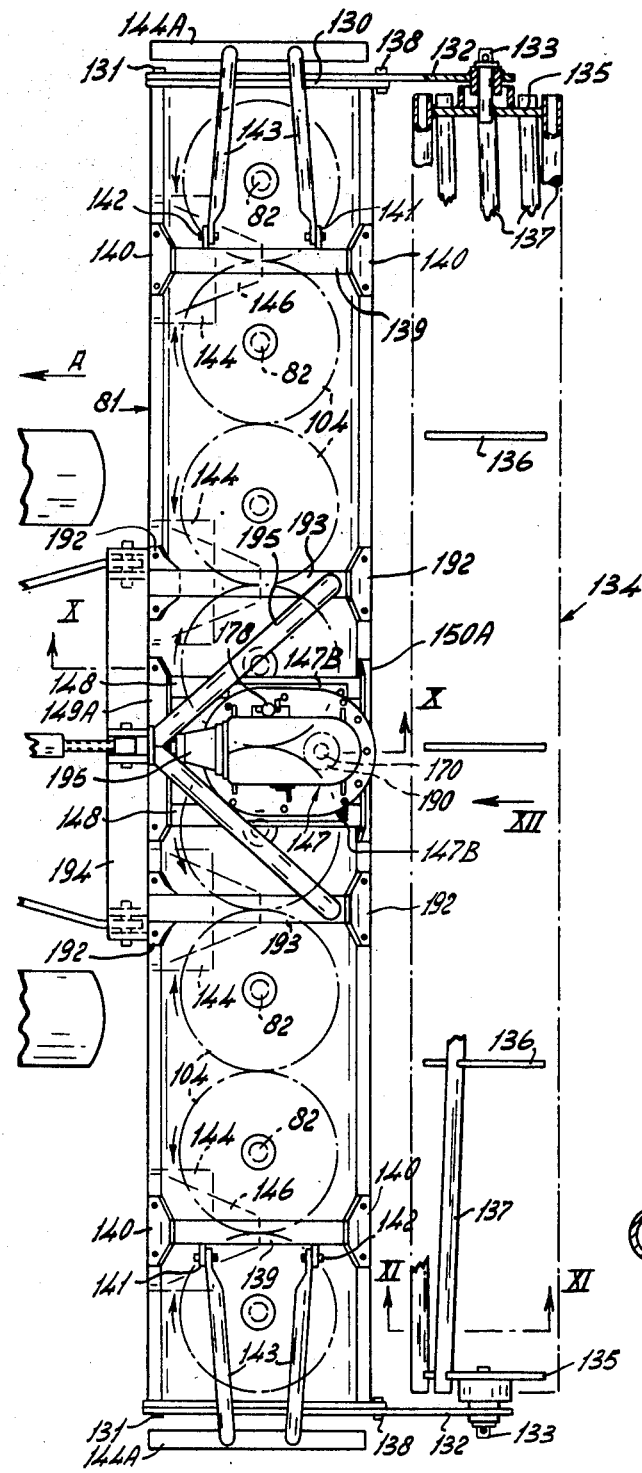
Figure 11:
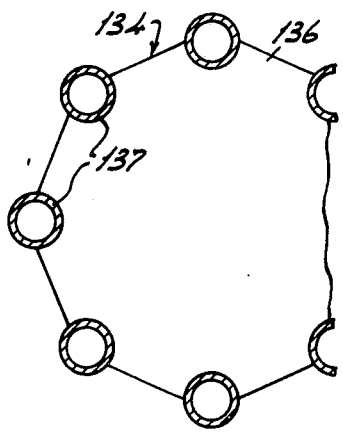
Figure 10:
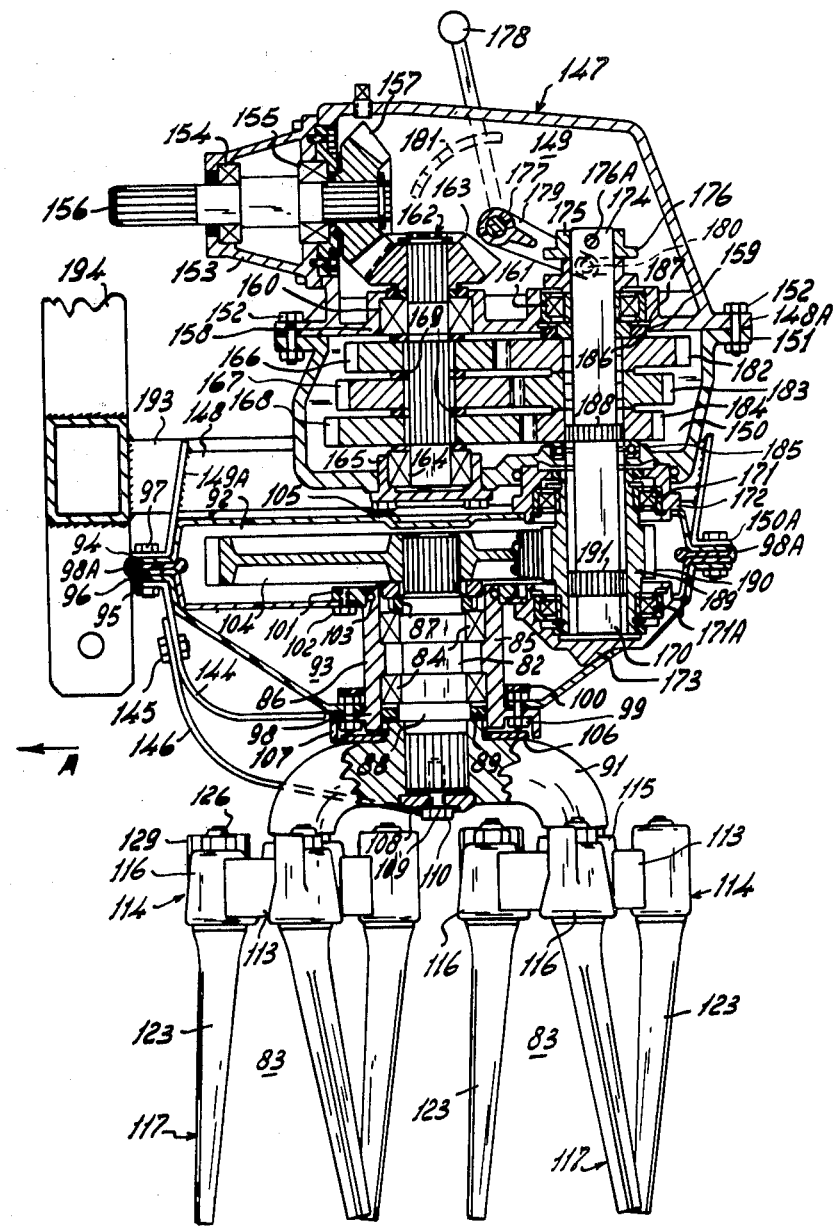
Figure 13:
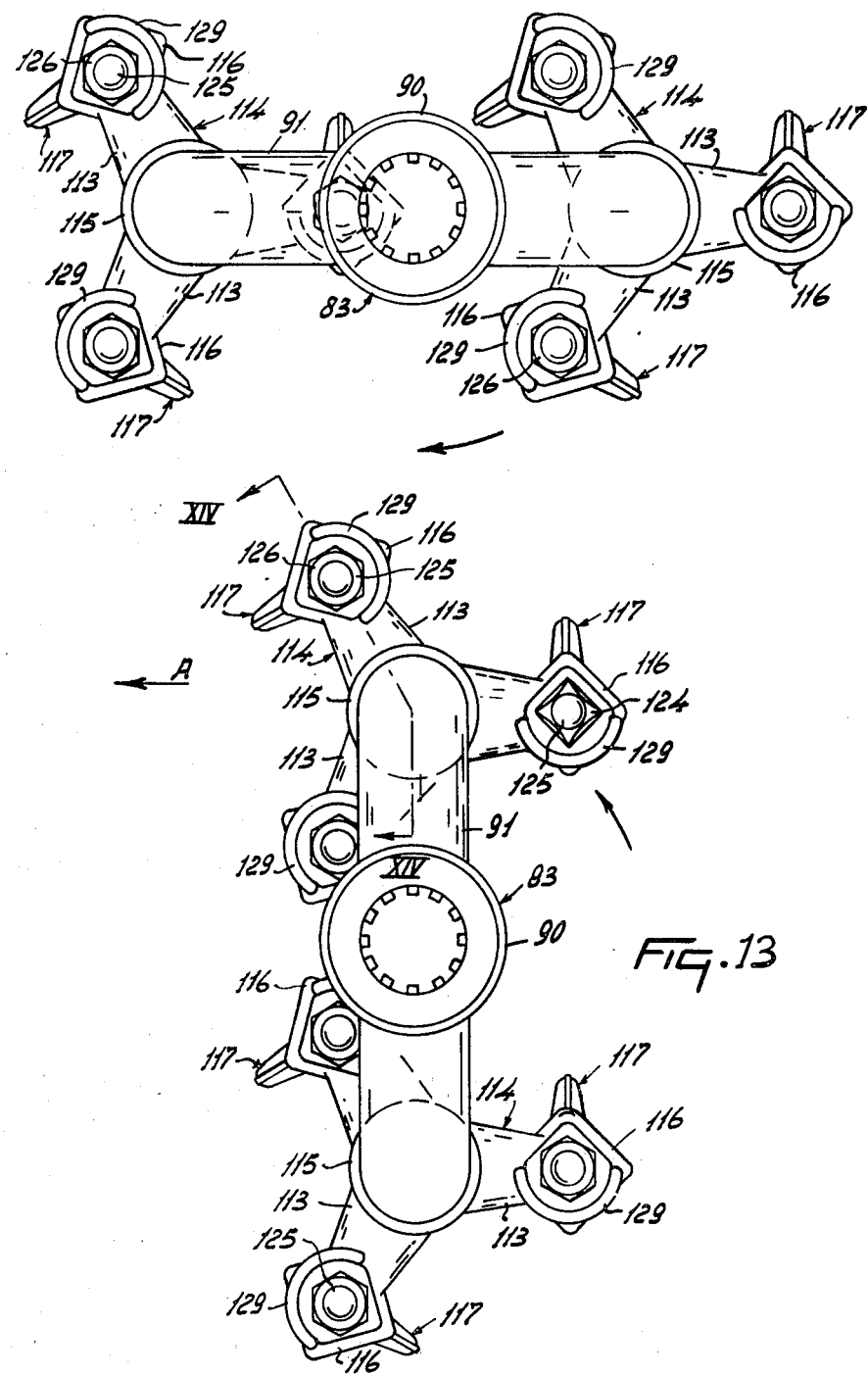

For a better understanding of the invention and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a section, to an enlarged scale, taken on the line II—II in FIG. 1, FIG. 3 is a plan view, to an enlarged scale as compared with FIG. 1, of part of an implement that is similar in most respects to the implement of FIGS. 1 and 2 but which incorporates alternative members, FIG. 4 is a section taken on the line IV—IV in FIG. 3, FIG. 5 is a plan view of an alternative form of soil cultivating implement in accordance with the invention shown connected to the three-point lifting device or hitch of an agricultural tractor or other operating vehicle, FIG. 6 is a section, to an enlarged scale, taken on the line VI—VI in FIG. 5, FIG. 7 is similar to FIG. 6 but illustrates the provision of alternative members for the implement of FIG. 5, FIG. 8 is a plan view of the construction illustrated in FIG. 7, FIG. 9 is a plan view of a third embodiment of a soil cultivating implement in accordance with the invention, FIG. 10 is a section to an enlarged scale taken on the line X—X in FIG. 9, FIG. 11 is a section to an enlarged scale taken on the line XI—XI in FIG. 9, FIG. 12 is part of a rear view of the implement shown in FIG. 9, FIG. 13 is a section taken on the line XIII—XIII in FIG. 12, FIG. 14 is a section taken on the line XIV—XIV in FIG. 13, FIG. 15 is an elevation in the direction of the arrow XV in FIG. 14, FIG. 16 is an elevation in the direction of the arrow XVI in FIG. 15 and FIGS. 17 to 20 are sections on the lines XVII—XVII, XVIII—XVIII, XIX—XIX, and XX—XX in FIG. 15 respectively.

Referring to FIGS. 1 and 2 of the accompanying drawings, the soil cultivating implement that is illustrated therein has a supporting frame that is generally indicated by the reference 1, said frame including a pair of parallel and substantially horizontally disposed beams 2, said beams 2 being spaced apart from one another in the intended direction of operative travel of the implement which is indicated by an arrow A with both of them extending transverse, and usually substantially perpendicular, to the direction A. Each of the frame beams 2 is of hollow construction and has a polygonal cross-section which it is preferred should be square as can be seen in FIG. 2 of the drawings. Each beam 2 is arranged so that, with the preferred square cross-section or any other polygonal cross-section, at least one flat side thereof is horizontally or substantially horizontally disposed. The ends of the beams 2 are interconnected by substantially vertically disposed side plates 3 of the supporting frame 1, said side plates 3 being substantially parallel to one another and to the direction A and being dimensioned so that both of them project both forwardly beyond, and rearwardly behind, the two frame beams 2 with respect to the direction A. A number, such as four, of strengthening strips 2A extend substantially horizontally parallel to the direction A in interconnecting relationship with the two frame beams 2. Bars 4 of L-shaped cross-section are secured to the two upright sides of the two square cross-section frame beams 2 that face one another, the permanent connections being effected by welding with the bars 4 located close to the tops of the two beams 2. Each bar 4 has its substantially vertical limb welded to the upright side of the corresponding beam 2 in such a way that the substantially horizontal limb thereof projects from the substantially vertical limb towards the other bar 4. As can be seen in FIG. 2 of the drawings, this arrangement disposes the two substantially horizontal limbs of the two bars 4 at a level just above that of the tops of the two beams 2 and in regularly spaced apart relationship, throughout their lengths, between said beams 2.

Six gear boxes 5 are secured by substantially vertical bolts to the substantially horizontal limbs of the bars 4 in such a way that said six gear boxes 5 extend in a row in substantially regularly spaced apart relationship in a substantially horizontal direction that is perpendicular to the direction A, the spacings between the two end gear boxes 5 of the row and the corresponding adjacent side plates 3 of the supporting frame 1 being substantially the same as is the distance between any two immediately neighbouring gear boxes 5 in the row (see FIG. 1). Each gear box 5 rotatably supports a corresponding upwardly extending shaft 6 whose longitudinal axis (axis of rotation) will usually be vertically or substantially vertically disposed. The lowermost ends of the six shafts 6 project downwardly from beneath the bottoms of the six gear boxes 5 and are there externally splined for co-operation with hubs at the centers of supports 7, said hubs being internally splined to match the splines on the shafts 6. Axial disengagement of the supports 7 from the shafts 6 is prevented by the provision of washers (not shown) and nuts (not shown) the latter co-operating with screwthreads on short downward extensions (not shown) of the shafts 6. Each support 7 comprises two axially aligned arms that extend radially away from the corresponding hub in diametrically opposite directions, said arms being provided at, or very near to, their free ends with stub shafts 8 that are in parallel or substantially parallel relationship with the corresponding shafts 6.

Each stub shaft 8 projects downwardly from beneath the bottom of the corresponding support 7, the downwardly projecting portion having the hub 9 of a corresponding cultivating tool that is generally indicated by the reference 11 mounted thereon in a freely rotatable manner. Each hub 9 is located at the center of a corresponding support 12 which comprises three arms that project outwardly away from the hub 9 at 120° intervals around the longitudinal axis (axis of rotation) of that hub. As can be seen in FIG. 2 of the drawings, each arm of each support 12 is not strictly radially disposed with respect to the longitudinal axis of the corresponding hub 9 but is inclined obliquely downwardly towards the ground surface from the hub 9 concerned towards its outermost end. The outermost end of each arm of each support 12 has a corresponding tine holder 13 rigidly secured to it, said tine holders 13 being of sleeve-like formation and upwardly tapering substantially frusto-conical configuration. It will be appreciated that each cultivating tool 11 comprises three of the tine holders 13 and it will be seen from the drawings that each tine holder 13 firmly but releasably receives an upper fastening portion of a corresponding rigid soil working tine 10.

The interior of each tine holder 13 is preferably of square cross-section and, with this preferred cross-section, the fastening portion of each tine 10 has a matching cross-section with the exception of a short screwthreaded uppermost part thereof that is arranged for co-operation with a corresponding fastening nut (see FIG. 2). Once the fastening portions of the tines 10 have been entered upwardly into the holders 13 and the fastening nuts have been applied to said screwthreaded parts and subsequently tightened, the tines 10 cannot turn about the longitudinal axes of their fastening portions relative to the holders 13. The internal bores of the holders 13 and the parts of the tine fastening portions that co-operate therewith are, like the external profiles of the holders 13, of upwardly tapering configuration. The fastening portion of each tine 10 is integrally connected to a soil working portion of that tine in such a way that the longitudinal axes of the two straight portions are inclined to one another, at the integral junction between them, by an angle of not less than substantially 15°. The soil working portion of each tine 10 is of square or at least rectangular cross-section, as illustrated, or has some other polygonal cross-section and it tapers gently in a downward direction towards its lowermost free end or tip from its integral junction with the corresponding fastening portion. With the substantially square cross-section of each soil working portion and of the corresponding fastening portion (except the uppermost screwthreaded part thereof) that has been described, each tine 10 can be set in any one of four different angular positions around the longitudinal axis of the corresponding holder 13. Clearly, all that is required to bring one of the tines 10 from one such angular setting to one of the other possible settings, is to release the co-operating nut, draw the fastening portion downwardly until it is clear of the interior of the co-operating holder 13, turn the tine through the required angle of 90° or 180° about the longitudinal axis of its fastening portion, enter the fastening portion upwardly in the new setting into the co-operating holder 13, and finally replace the retaining nut. It will be appreciated that the ability to re-position the tines 10 of each cultivating tool 11 enables the widths of the strips of soil that are worked by the three tines 10 of each tool 11, during operation of the implement, to be varied. Clearly, by giving the fastening portions of the tines 10 and the co-operating interiors of the holders 13 other matching polygonal cross-section, numbers of angular settings, other than four, of the tines 10 could readily be provided. In the angular positions of the tines 10 that are illustrated in FIGS. 1 and 2 of the drawings, the obliquely downwardly directed soil working portions of those tines are inclined rearwardly from top to bottom so as to trail with respect to the directions of rotation about the axes of the stub shafts 8 which the tools 11 will normally follow during operation of the implement. These directions of rotation are indicated by small arrows in FIG. 1 of the drawings in respect of the pair of tools 11 that is at the foot of that Figure and in respect of the tool 11 which is uppermost in the same Figure.

Each shaft 6, the corresponding support 7 and the corresponding pair of freely rotatable tined cultivating tools 11 affords a soil working or cultivating member that is generally indicated by the reference 14, there thus being six of the soil working or cultivating members 14 that are mechanically driven to revolve about the axes of the corresponding shafts 6 during the operation of the implement. It will be noted that, in the embodiment which is being described, the distance between the longitudinal axes of the two stub shafts 8 of each member 14 is substantially 35 centimeters so that the substantially parallel axes of rotation of the two tools 11 of each member 14 are spaced apart from one another by that distance. The downwardly directed soil working portions of the tines 10 are of straight configuration and, when the fastening portions of the three tines 10 of each tool 11 are disposed in the angular settings in their holders 13 that are illustrated in FIGS. 1 and 2 of the drawings, the soil working portions of those three tines 10 work a strip of soil having a width of substantially 20 centimeters, said strip extending lengthwise in the direction A.

Each shaft 6 is provided, inside the corresponding gear box 5, with a crown wheel or bevel pinion 15 whose teeth are in driven mesh with those of a smaller bevel pinion 16 mounted on a substantially horizontal driving shaft that extends through the gear boxes 5 and through tubular connecting members 17, arranged between the successive gear boxes 5, in a direction that is perpendicular to the direction A. It will be noted that the bevel pinions 16 are arranged on said driving shaft for co-operation with the crown wheels or bevel pinions 15 in such a way that, when the implement is in use, each shaft 6 and the corresponding soil working or cultivating member 14 will revolve in a direction that is opposite to the direction of rotation of the immediately neighbouring shaft 6 and member 14 in the single row thereof or to the directions of rotation of both the neighbouring pairs of those units in that row. In this connection, reference is directed to the arrows that appear in FIG. 1 of the drawings to indicate the intended directions of operative rotation of the shafts 6 and the members 14 that are fastened to those shafts. The longitudinal axes (axes of rotation) of the successive shafts 6, and thus of the successive members 14, are spaced apart from one another by distances of substantially 50 centimeters in the embodiment that is illustrated in FIGS. 1 and 2 of the drawings. In fact, the substantially horizontal driving shaft that is substantially perpendicular to the direction A is not a single unit but is provided in at least three sections. It will be noted from FIG. 1 that a central gear box 18 interconnects the two innermost gear boxes 5 of the row of six gear boxes 5 in place of one of the tubular connecting members 17 and has the same longitudinal extent in a horizontal direction that is perpendicular to the direction A as does each of said connecting members 17. At least one innermost section of the substantially horizontal driving shaft that has just been mentioned is rotatably mounted in the central gear box 18 and projects from opposite sides of that gear box into the two immediately neighboring gear boxes 5. The opposite ends thereof are coaxially connected, in a manner which it is not necessary to describe nor illustrate for the purposes of the present invention, to two outer sections of the substantially horizontal driving shaft which transmit drive to the three shafts 6 that lie at opposite sides of the central gear box 18 when the implement is viewed in plan (FIG. 1). Depending upon the internal construction of the central gear box 18, the central section of the substantially horizontal driving shaft may be a single section or two separate but coaxial sections. In either case, the central gear box 18 has a rotary input shaft 19 that projects substantially horizontally forwardly from the front thereof in substantially the direction A, the leading end of said shaft 19 being splined or otherwise keyed to enable it to be placed in driven connection with the power take-off shaft of an agricultural tractor or other operating vehicle by way of an intermediate telescopic transmission shaft, that is of a construction which is known per se, having universal joints at its opposite ends. The rotary input shaft 19 is provided, inside the central gear box 18, with a bevel pinion whose teeth are in driving mesh with one or two larger bevel pinions mounted on the central section or sections of the substantially horizontal driving shaft that extends substantially perpendicular to the direction A. It is, in fact preferred to provide the central section of that shaft as two separate but coaxial units in which case the bevel pinion carried by the rotary input shaft 19 co-operates with two bevel pinions each one of which is mounted on a corresponding one of the two co-axial units of said central section.

Substantially horizontally aligned stub shafts 20 are provided in central regions of the two side plates 3 and corresponding arms 21 are turnable upwardly and downwardly about those stub shafts 20 alongside the outer surfaces of the two side plates 3. The arms 21 extend rearwardly from the stub shafts 20 with respect to the direction A and project rearwardly beyond the side plates 3. Rear edge regions of the two side plates 3 are formed with curved rows of holes 23 in which each hole 23 is at the same distance from the axis defined by the two stub shafts 20. Each arm 21 is formed with a single hole at the same distance from said axis and that hole can be brought into register with any chosen one of the corresponding row of holes 23 by turning the arm 21 concerned to an appropriate angular position about the stub shaft 20 upon which it is mounted. Bolts 22 are provided for horizontal entry through the single holes in the arms 21 and through chosen holes 23 to fix the arms 21 releasably in corresponding angular settings about said axis. The rearmost ends of the arms 21 with respect to the direction A are provided with substantially horizontally aligned bearings 24 which receive horizontal stub shafts 25 at the opposite ends of a rotatable supporting member in the form of a ground roller 26. The roller 26 comprises a central axially disposed tubular support 27 to which seven substantially circular support plates 28 are secured at regularly spaced apart intervals with two of said plates 28 located at the opposite ends of the support 27. The seven support plates 28 are all substantially vertically disposed in parallel relationship with one another and substantially parallel relationship with the direction A. Each of the support plates 28 is formed close to its circumference with a number of holes that are regularly spaced apart from one another around the longitudinal axis of the central tubular support 27. In the case of each of the first, second, fourth, sixth and seventh of said plates 28 counting from either end of the roller, there are eight of said holes that are spaced apart from one another at regular 45° intervals around said axis whilst, in the case of each of the third and fifth plates 28 counting from either end of the roller 26, there are sixteen of said holes that are spaced apart from one another at regular 22½° intervals around the longitudinal axis of the support 27.

Three groups of elongated elements 29 of rod-like formation are entered through the various holes that are close to the peripheries of the support plates 28 and it will be seen from FIG. 1 of the drawings that, considered in a direction parallel to the longitudinal axis of the central support 27 of the roller 26, each element 29 has a length which is a little in excess of the distance between one of the support plates 28 and the plate 28 that is next but one along the roller 26 therefrom. Each element 29 is entered with some clearance through the holes in the three plates 28 with which it co-operates and transverse pins are entered through bores formed very close to its opposite ends to prevent unwanted axial disengagement of each element 29 from the corresponding plates 28. It can be seen from FIG. 1 of the drawings that the three groups of elements 29 are arranged in immediately succeeding relationship along the length of the roller 26 with said groups successively overlapping at the third and fifth plates 28 counting from either end of the roller 26. It will be remembered that it is these plates that are each formed with sixteen, rather than eight, peripheral holes, said sixteen holes alternately receiving the ends of the eight elements 29 of each of the two groups of those elements that overlap at the plate 28 concerned. It will also be noted from FIG. 1 of the drawings that each element 29 is formed at substantially its midpoint with a sharp angular bend or "kink", said bends or kinks thus registering with the peripheral holes in the second, fourth and sixth support plates 28 counting from either end of the roller 26 and said elements 29 being so disposed that the angular point which is defined by each bend or kink is orientated rearwardly with respect to the direction A when said bend or kink is in contact with, or very close to, the ground surface during the operation of the implement. Moreover, each group of eight bends or kinks and the support plate 28 with which they correspond is contained in a corresponding substantially vertical plane that is substantially parallel to the direction A and which passes midway between the axes of rotation of the shafts 6 of two co-operating rotary soil working or cultivating members 14. "Co-operating" means that the directions of positive rotation of the two members 14 concerned are such that parts of those members move rearwardly with respect to the direction A when in the proximity of the planes that have just been defined, reference being made to the arrows shown in FIG. 1 of the drawings that denote the directions of operative rotation of the members 14 about the longitudinal axes of the corresponding shafts 6.

In addition to the stub shafts 20, the central regions of the two side plates 3 also carry substantially horizontally aligned stub shafts 30 that are quite close to the stub shafts 20 but that are located forwardly therefrom with respect to the direction A. Arms 31 are turnable upwardly and downwardly about the stub shafts 30 alongside the outer surfaces of the side plates 3, said arms 31 extending forwardly to locations beyond the leading edges of the side plates 3 with respect to the direction A, the leading ends of said arms 31 being inclined downwardly (see FIG. 2). Curved rows of holes 33 are formed close to the leading edges of the side plates 3 with each hole 33 at the same distance from the axis defined by the aligned stub shafts 30. The arms 31 are formed with single holes that are at the same distance from said axis and bolts 32 are provided for horizontal entry through the single holes in the arms 31 and chosen holes 33 to secure the arms 31 releasably in corresponding angular positions about the substantially horizontal axis defined by the stub shafts 30.

It will be evident from FIG. 1 of the drawings that the arms 31 extend horizontally, or substantially horizontally, forwardly from the stub shafts 30 to locations that substantially coincide with the single holes therein that are arranged to co-operate with the bolts 32 whereafter the aforementioned downwardly and forwardly inclined leading ends thereof, commence, said leading ends being of rectilinear configuration. Substantially horizontally aligned stub shafts 34 are carried near to the lowermost leading extremities of the end portions of the arms 31 and a support 35 is pivotally mounted between the two stub shafts 34 so as to be turnable about its own substantially horizontally extending longitudinal axis. The support 35 comprises a beam 36 of channel-shaped cross-section between the limbs of which a second beam 37 of channel-shaped cross-section is arranged, the second beam 37 having shorter limbs than the beam 36 and being arranged so that, as seen in cross-section (FIG. 2), the edges of the limbs of the second beam 37 lie alongside those of the limbs of the first beam 36 in mutually registering relationship. The four limbs of the two beams 36 and 37 are interconnected at substantially regular intervals along the support 35 by pairs of bolts 38. In addition to interconnecting the limbs of the beams 36 and 37, each pair of bolts 38 also secures a corresponding pair of elongated elements 39 between the limbs of the second beam 37. The elongated elements 39 are in the form of rectangularly shaped spring steel strips and are made in integral pairs with the junctions between the two elements 39 of each pair being the parts thereof that lie between the limbs of the second beam 37 where they are retained by the corresponding pairs of bolts 38. It can be seen from the drawings that the elongated elements 39 are not all of the same length and the reason for this will be discussed below. Each element 39 has a substantially rectangular free end and it will be seen from the drawings that the elements 39 are inclined downwardly and rearwardly with respect to the direction A from the support 35 in such a way that their free ends are located close (as seen in plan view FIG. 1) to the circular paths that are traced by the tines 10 of the cultivating tools 11 of the successive soil working or cultivating members 14 during the positive rotation of those members about the axes of the shafts 6. Thus, those elements 39 that are disposed substantially directly in register with the shafts 6 in the direction A are the shortest while those that are located in register with positions midway between the pairs of shafts 6 are the longest, the other elements 39 being of progressively differing intermediate lengths. A careful study of FIG. 1 of the drawings will also show that those elements 39 of each pair that are longest and substantially in register in the direction A with locations midway between two of the shafts 6 are closer to one another than are the two elements 39 of each pair that are substantially in register in the direction A with one of the shafts 6, the latter elements being shorter. This arrangement enables the longest elements 39 to extend rearwardly from the support 35 for a greater distance than would be possible if the two elements 39 of each longer pair were spaced apart from one another by the same distance as the two elements 39 of each shorter pair.

The opposite ends of the support 35 are provided, adjacent the stub shafts 34, with forwardly and downwardly projecting lugs 40 to which the lowermost ends of corresponding upright rods 42 are turnably connected by horizontal pivot pins 41. The rods 42 extend upwardly from their pivotal connections to the lugs through holes in brackets 43 that are secured to the arms 31. The uppermost end of each rod 42 is screwthreaded and carries a corresponding axially displaceable nut 45 and co-operating washer. Two helical compression springs 44 are wound around each rod 42, one spring 44 bearing between the upper surface of the corresponding bracket 43 and the lower surface of the washer that co-operates with the corresponding nut 45 and the other spring 44 bearing between the lower surface of the corresponding bracket 43 and an enlargement at the lower end of the rod which forms part of the pivotal connection of that rod to the corresponding lug 40 by way of the corresponding pin 41. With this arrangement, the support 35 and the elongated elements 39 will tend to occupy a substantially fixed angular position about the axis defined by the stub shafts 34 relative to the arms 31 but upward or downward pivotal movements about said axis are readily possible, away from the substantially fixed position, against the action of either the upper springs 44 or the lower springs 44. The substantially fixed angular position can be adjusted, as may be required, by moving the nuts 45 upwardly or downwardly along the screwthreaded upper ends of the rods 42.

Soil crumbling members 48 are connected to the leading frame beam 2 of the supporting frame 1 by clamping plates 46 and bolts 47 at locations which, as seen in plan view (FIG. 1), are midway between planes that contain the longitudinal axes of the shafts 6 and that are all parallel to the direction A. Each soil crumbling member 48 is in the form of a spring steel strip of substantially U-shaped configuration when seen in side elevation (FIG. 2), the limbs of the "U" being of dissimilar lengths. Each soil crumbling member 48 has an effective portion (i.e., that part thereof that is not clamped to the leading frame beam 2) which initially projects forwardly with respect to the direction A from the corresponding clamping plates 46 for a short distance whereafter it is bent downwardly and rearwardly through substantially 180° to terminate in a much longer substantially flat and substantially horizontally disposed portion that is located immediately above the level of the tops of the cultivating tools 11. As seen in side elevation (FIG. 2), the rearmost end of the lower and longer portion of each soil crumbling member 48 that has just been discussed is substantially in register with a plane containing the axes of rotation of the six shafts 6, said rearmost ends being tapered to rounded points (see FIG. 1). It is noted that the width of the spring steel strip which affords each soil crumbling member 48 is substantially the same as the maximum width of the region of overlap between the circular paths that are traced by the outermost extremities of two immediately neighbouring soil working or cultivating members 14 of the implement during its operation (see FIG. 1).

Two shield plates 52 that are usually substantially vertically disposed are arranged near the side plates 3 of the supporting frame 1 immediately beyond the opposite ends of the row of six rotary soil working or cultivating members 14. The upper edge of each shield plate 52 is connected by a corresponding pair of arms to substantially horizontally aligned pivots which define axes that are substantially parallel to the direction A, said pivots being mounted on top of the frame beams 2 at short distances inwardly from the ends of those beams. The lower edges of the shield plates 52 are shaped to slide over the ground surface in the direction A during operation of the implement and the fact that said plates 52 are turnable upwardly and downwardly about the axes which are defined by the corresponding pairs of pivots enables said plates to match any undulations in the surface of the ground that may be met with during operation. The shield plates 52 minimise ridging at the opposite edges of the broad strip of soil that is worked by the implement and greatly reduce the number of stones and like potentially dangerous objects that are flung laterally of the path of travel by its rotating soil working or cultivating members 14.

FIGS. 3 and 4 of the drawings illustrate a construction in which the soil crumbling members 48 of FIGS. 1 and 2 are replaced by soil crumbling members 49 in the form of two integral pairs of spring steel or other resilient tines 51. The two pairs of tines 51 of each soil crumbling member 49 are secured by upright bolts to a corresponding horizontally disposed support plate 50 that is welded to the bottom of the leading frame beam 2 of the supporting frame 1 so as to project forwardly therefrom with respect to the direction A. The two tines 51 of each pair are formed integrally from spring steel or other resilient material of circular cross-section and are of dissimilar lengths, the outermost (at their root ends) two tines 51 of each soil crumbling member 49 being the longer. The inner two tines 51 of each member 49 have approximately half the lengths of the outermost two tines 51. The two tines 51 of each pair merge at their leading root ends into helical coils and those helical coils are integrally interconnected by a substantially hairpin-shaped fastening portion that is secured to the support plate 50 concerned by one of the aforementioned bolts. It will be seen from FIGS. 3 and 4 of the drawings that the effective substantially straight portions of the tines 51 extend substantially horizontally rearwards, with respect to the direction A, from the corresponding helical coils with the two pairs of tines 51 of each member 49 arranged in rearwardly convergent relationship. In each member 49, the rearmost ends of the two longer tines 51 are disposed in very close proximity to one another as are also the rearmost ends of the two shorter tines 51. The effective portions of all of the tines 51 are located immediately above the tops of the cultivating tools 11 and the rearmost free ends of the longer tines 51 of each member 49 substantially coincide, as seen in plan view (FIG. 3), with a plane containing the longitudinal axes of all six of the shafts 6.

In the use of the implement that has been described with reference to FIGS. 1 and 2 of the accompanying drawings or with reference to that embodiment as modified by FIGS. 3 and 4 of those drawings, a coupling member or trestle 53 that is of generally triangular configuration when viewed in front or rear elevation is connected to the upper and lower lifting links of a three-point lifting device or hitch at the rear of an agricultural tractor or other operating vehicle and the rotary input shaft 19 of the central gear box 18 is placed in driven connection with the power take-off shaft of the same tractor or other vehicle through the intermediary of the aforementioned telescopic transmission shaft having universal joints at its opposite ends. Upon driving the rotary input shaft 19, the six shafts 6 and the corresponding soil working or cultivating members 14 will be caused to revolve around the axes of those shafts 6 in the directions that are indicated by arrows in FIG. 1 of the drawings due to the substantially horizontal driving shaft that has been discussed above and the transmission members that are contained in the gear boxes 18 and 5. During the positive rotation of the members 14 about the axes of the shafts 6, the cultivating tools 11 will simultaneously revolve in a more or less regular manner around the axes of the corresponding stub shafts 8 in the directions that are indicated for only three of the tools 11 in FIG. 1 of the drawings. A more or less regular ground-driven rotation of the tools 11 is produced as a result of the contact of the soil working portions of the tines 10 with the ground but it will be appreciated that, should one or more of the soil working tine portions meet an embedded stone or other substantially immovable obstacle, the rotation of the tool 11 concerned may be temporarily halted or even be momentarily reversed in direction. The free rotatability of the tools 11 considerably reduces the likelihood of breakage of, or serious damage to, the tines 10 upon meeting more or less immovable obstacles in the soil since, generally speaking, the tines 10 are capable of circumnavigating such obstacles unless they are considerably greater in size than is usual in previously worked agricultural land. The axes about which the tools 11 are freely rotatable are parallel to the axes of the shafts 6 about which the members 14 are positively rotated. The support 35 that is arranged in front of the supporting frame 1 with respect to the direction A is set in such a position (by appropriate upward or downward adjustment of the arms 31 about the axis defined by the stub shafts 30) that parts of lower edges of the elongated elements 39 will be drawn through the soil surface (see FIG. 2), said elements 39 thus constituting means for cultivating soil. The general plane of each element 39 is substantially vertically disposed and is substantially parallel to the direction A and, with this construction and arrangement, a broad strip of land that substantially coincides with the strip of land that is worked by the six members 14 is preliminarily worked by the immediately foregoing elements 39. The elements 39 are formed from spring steel or from some other strip-shaped sheet material of more or less equivalent resilience and this enables them to deflect to avoid any obstacles that they may meet and to move through the soil in a somewhat vibratory manner, it being understood that the resistance to their progress through the soil that they will meet varies continuously and irregularly. The rearmost ends of the elements 39 with respect to the direction A are disposed so close to the circular paths of movement of the cultivating tools 11 that they are within the effective working area of those tools and the elements 39 thus act as means to counter act excessive, and therefore undersirable, lateral displacement of soil by the tools 11. Soil displaced forwardly with respect to the direction A by the tools 11 of the members 14 is engaged between the elements 39 and is gradually released rearwardly as the operative progress of the implement continues.

If the lowermost edges of the elements 39 are formed as cutting edges, this makes them particularly suitable for employment with the implement in the cultivation of land that is heavily infested with weeds. The downward and rearward inclination of the elements 39 with respect to the direction A greatly facilitates the rapid shedding by those elements of any weed portions or other agricultural debris that may be picked up by the elements during forward progress in the direction A. In addition to the resilient construction of the elements 39 that allows them to deflect laterally to avoid stones or other obstacles, it will be remembered that the support 35, together with all of the elements 39, is upwardly and downwardly displaceable, against the resilient opposition of the springs 44, about the axis defined by the stub shafts 34 and this upward and downward yieldability also enables the elements 39 to avoid damage. The nuts 45 can be adjusted lengthwise along the rods 42, as may be required, to increase or decrease the pressure by which the lower edges of the elements 39 bear penetratingly against the soil surface.

During operation of the implement, an intensive co-operation exists between the effective portions of the resilient soil crumbling members 48 or 49 and the immediately underlying freely rotatable cultivating tools 11 of the positively rotated soil working or cultivating members 14. This co-operation ensures that the worked soil becomes finely divided and the described and illustrated shaping of the rearmost ends of the members 48 ensures that the finely crumbled soil is satisfactorily conducted away from the crumbling area, choking by weeds and/or jamming by stones or the like being extremely uncommon because of the resilient construction of the members 48. In the case of the members 49 of FIGS. 3 and 4 of the drawings, the resilient construction and arrangement of their tines 51, combined with the circular cross-section of the spring steel or other resilient material from which the tines are made is equally effective in conducting the crumbled soil away from the crumbling area and in making choking by weeds and/or jamming by stones a very infrequent occurrence.

The level of the axis of rotation of the ground roller 26 that is appointed relative to the level of the supporting frame 1 by choosing appropriate holes 23 for co-operation with the bolts 22 is a principal factor in determining the maximum depth of penetration of the tines 10 into the soil which is possible during the operation of the implement and, generally speaking, this adjustment is made at the commencement of a cultivating operation before the previously described adjustment of the positions of the elongated elements 39 is undertaken. It will be noted from FIG. 1 of the drawings that the second, fourth and sixth support plates 28 of the roller 26, counting from either end of the roller, are in substantial register, in the direction A, with the regions of overlap between three corresponding pairs of the members 14 in which parts of the two members 14 of each such pair move rearwardly with respect to the direction A through the regions of overlap towards the roller 26 when the implement is in operation. Generally speaking, it is in these three regions that a perponderance of the soil displaced by the six members 14 will be delivered so that there is some tendency for the crumbled soil to be formed into ridges that extend parallel to the direction A in register with the three regions of overlap that have just been discussed. Such ridging is greatly minimised, if not entirely eliminated, by the fact that the sharp angular bends or kinks in the elongated elements 29 of each of the three groups of those elements coincide with the second, fourth and sixth support plates 28 of the roller 26 so that said elements tend to spread soil laterally away from the sharp angular bends or kinks that are formed substantially midway therealong thus distributing any earth ridges that may have been formed more or less uniformly throughout the whole working width of the implement.

FIGS. 5 and 6 of the drawings illustrate an alternative form of soil cultivating implement in accordance with the invention which implement includes a number of parts that are similar, or identical, to parts of the two embodiments that have already been described with reference to FIGS. 1 to 4 of the accompanying drawings. Such parts are indicated in FIGS. 5 and 6 of the drawings by the same references as are used for the corresponding parts in FIGS. 1 to 4 and will not be described again in detail. The implement of FIGS. 5 and 6 has a frame in the form of a hollow frame portion 54 that extends substantially horizontally transverse, and usually substantially horizontally perpendicular, to the intended direction of operative travel of the implement that is again indicated by an arrow A. Six upwardly extending shafts 55 that will usually be vertically or substantially vertically disposed are rotatably mounted in the hollow frame portion 54 in such a way that their longitudinal axes (axes of rotation) are spaced apart from one another by distances of substantially 50 centimeters. The lowermost end of each shaft 55 projects from beneath the bottom of the hollow frame portion 54 and is there provided with a corresponding tined soil working or cultivating member 56. Each member 56 comprises two diametrically opposed rigid soil working tines 57 and each shaft 55 is rotatably supported in a lower trough 60 of the hollow frame portion 54 by bearings located in a corresponding bearing housing 58 which it is not necessary to described nor illustrate in detail for the purposes of the present invention. The hollow frame portion 54 is made from sheet steel and comprises, in addition to the lower trough 60, an upper chamber 59. The longitudinal axes of the chamber 59 and trough 60 extend substantially horizontally perpendicualar to the direction A and are in parallel relationship with one another. The chamber 59 is of substantially rectangular cross-section whereas the underlying trough 60, when considered together with a lower wall of the chamber 59, is of substantially inverted trapezoidal cross-section. The chamber 59 has upper and lower walls that are both formed from sheet steel, the upper wall comprising a substantially horizontal portion that has obliquely downwardly divergent front and rear edges of symmetrically identical construction. Each of said front and rear edges is provided with a horizontally bent-over clamping rim 61 that extends throuhghout the length (transverse to the direction A) of the edge of the wall concerned. The lower wall is of inverted substantially symmetrically identical construction to the upper wall and thus comprises a substantially horizontal portion flanked by upwardly obliquely divergent front and rear edges that are both formed with horizontally bent-over clamping rims 62 that, like the rims 61, extend throughout the transverse lengths of the front and rear edges of the lower wall. With this substantially symmetrically identical construction of the upper and lower walls, the rims 61 of the upper wall are spaced from the horizontal portion thereof by substantially the same distance as are the rims 62 from the substantially horizontal portion of the lower wall. The trough 60 has a substantially horizontally disposed central portion or base that is relatively narrow in the direction A, said central portion being a portion of a sheet metal wall of the trough which is bent over at the front and rear eges so as to form further symmetrically disposed upwardly divergent portion. The upper edges of these divergent portions are, in turn, bent over to form further less steeply divergent portions which bear against the outer surfaces of the upwardly divergent front and rear edges of the lower wall of the chamber 59, said less steeply divergent portions terminating in horizontally bent-over clamping rims 63 whose upper surfaces abut against the lower surfaces of the clamping rims 62 at the front and rear edges of the lower wall of the chamber 59. The clamping rims 61 and 62 of the upper and lower walls of the chamber 59 are secured to one another by vertically disposed bolts 64 with the interposition of a gasket 65A formed from a hard synthetic plastics material. The gasket 65A is strip-shaped and its opposite edges are formed with inner and outer rims of different shapes. The inner rims are of hollow tubular configuration and lie between the upwardly and downwardly inclined edges of the upper and lower walls of the chamber 59 whereas the outer rims are of solid formation and lie against the outermost extremities of the superposed clamping rims 61 and 62, the outer rim of the gasket 65A having a substantially flat inner surface which sealingly engages said extremities and a curved outwardly directed surface. The clamping rim 63 of the trough 60 forms a support for the upper chamber 59 and can, if desired, be releasably secured to the superposed clamping rims 61 and 62 of the upper and lower walls of the chamber 59 by further bolts (not illustrated) that are arranged in alternate relationship with the bolts 64 under which circumstances such further bolts can be released to allow the removal of the trough 60 without having to loosen the bolts 64 and break the gasketed seal between the clamping rims 61 and 62 of the chamber 59.

The lower wall of the upper chamber 59 and the base of the trough 60 are formed with vertically registering circular holes that are spaced apart from one another at regular distances of substantially 50 centimeters. These holes receive the bearing housings 58 for the shafts of the corresponding soil working or cultivating members 56. Each bearing housing 58 has a flange 65 at its lowermost end and the upper surface of this flange engages the lower surface of the base of the trough 60, vertically disposed bolts being provided to secure the flange 65 to the base of the trough 60. The upper end of each bearing housing 58 comprises a portion of reduced diameter and extends through the corresponding hole in the lower wall of the chamber 59 into the interior of that chamber. The portion of reduced diameter co-operates with a corresponding ring 66 that is bolted to the lower wall of the chamber 59 so as to lie principally on the upper surface of that wall in surrounding relationship with the hole therein. In fact, each ring 66 has a rim that extends into the corresponding hole in the lower wall of the chamber 59 said rim and/or the registering portion of the bearing housing 58 concerned being provided with at least one sealing ring so as substantially to prevent lubricant contained within the chamber 59 from penetrating downwardly into the trough 60. The upper end of each shaft 55 is located inside the chamber 59 and is there provided with a straight- or spur-toothed pinion 67, the six pinions 67 being so arranged that the teeth of each of them are in mesh with the teeth of the or each neighbouring pinion 67 of the row.

A gear box 69 is mounted substantially centrally across the width of the frame portion 54 at the top and front thereof with respect to the direction A. The gear box 69 is provided with a substantially horizontally disposed rotary input shaft 72 whose leading splined or otherwise keyed end projects forwardly from the front of the gear box in substantially the direction A for driven connection with the power take-off shaft of an agricultural tractor or other operating vehicle with the aid of an intermediate telescopic transmission shaft (not shown in detail) that is of a construction which is known per se having universal joints at its opposite ends. The input shaft 72 carries, inside the gear box 69, a bevel pinion 71 whose teeth are in driving mesh with those of a larger bevel pinion 70. The bevel pinion 70 is secured to the uppermost end of a substantially vertically disposed splined shaft 68 which is provided, throughout most of its length, with the hub of internally splined straight- or spur-toothed pinion of much smaller size than the pinions 67. Upper and lower ends of the hub of the small pinion that has just been mentioned, and thus the shaft 68, are rotatably supported by axially aligned and vertically spaced apart ball bearings, said bearings being arranged in lower and upper bearing housings, respectively, which housings are arranged in openings in the lower and upper walls of the chamber 59. The lower bearing housing is also partly located in an opening in the leading upwardly divergent portion of the wall of the trough 60. The top of the upper bearing housing is located inside a lower region of the gear box 69.

The opposite ends of the hollow frame portion 54 are closed by side plates 73 that extend substantially vertically parallel to one another and to the direction A, said side plates 73 being equivalent to the previously described side plates 3 even though they are somewhat different in shape and extent to those side plates 3. Thus, they have the roller 26 that affords a rotatable supporting member of the implement connected to them by the arms 21 so as to be upwardly and downwardly adjustable in level relative to the frame portion 54 and also have the support 35 connected to them by arms 74. The arms 74, like the previously described arms 31, are upwardly and downwardly pivotable about the axis defined by the stub shafts 30 but, in this case, the support 35 is not turnably connected to the arms 74 and upward and downward displaceability is provided by allowing said arms 74 to turn upwardly and downwardly about the axis defined by the stub shafts 30 freely but within limits. Excessive downward displacement of the support 35 and the elements 39 which it carries is prevented by abutment of the leading ends of the arms 74 against stops 75 (FIG. 6).

In this embodiment, soil crumbling members 76 are connected to the front of the hollow frame portion 54, with respect to the direction A, at locations that are midway between planes which extend parallel to the direction A and which contain the axes of rotation of the shafts 55. Each soil crumbling member 76 is made from spring steel or other resilient material in strip-shaped form and it will be seen from FIG. 6 of the drawings that the members 76 are provided in pairs which extend away from the locations at which they are secured to the frame portion 54 by appropriately positioned ones of the previously mentioned bolts 64 in a substantially S-shaped configuration as seen in side elevation (FIG. 6). The S-shaped parts of the members 76 of each pair bear against one another and abut against a front portion of the trough 60. At the lowermost ends of the S-shaped parts of the two members 76 of each pair, those two members become spaced from one another and extend, by way of substantially 180° bends, into effective portions that are substantially horizontally disposed in vertically spaced apart relationship, each effective portion being rectilinearly parallel to the direction A. It can be seen from both FIGS. 5 and 6 of the drawings that both the upper and lower soil crumbling members 76 of each pair have the rearmost ends of their lower effective portions disposed rearwardly just beyond, and thus substantially in register with, a plane that containes the longitudinal axes of all six of the shafts 55.

FIGS. 7 and 8 of the drawings illustrate an implement that is identical to the implement of FIGS. 5 and 6 except that the soil crumbling members 76 are replaced by soil crumbling members 77 in the form of pairs of tines 78 that are formed from spring steel rod or other material of substantially equivalent resilience, the spring steel rod or other material being of circular cross-section. The two tines 78 of each member 77 are formed integrally and comprise helical coils interconnected by a substantially hair-pin-shaped fastening portion which is secured to the hollow frame portion 54, at the front thereof with respect to the direction A, by a vertically disposed bolt that takes the place of one of the bolts 64, said replacing bolt being of greater length than the bolts 64. Each tine 78 has a substantially straight effective portion which is inclined downwardly and rearwardly away from its integral connection to the corresponding coil. The downward inclination is such that, as can be seen in FIG. 7 of the drawings, each such portion is in substantially parallel relationship with that portion of the front wall of the trough 60 which immediately adjoins the flat base thereof. The rearmost free ends of the tines 78 are disposed substantially midway between a plane containing the longitudinal axes of all six of the shafts 55 and a parallel plane containing the leading edge of the trough 60.

In the use of the soil cultivating implement that has been described with reference to FIGS. 5 and 6 of the drawings, with or without the modification that has been described with reference to FIGS. 7 and 8 thereof, the six soil working or cultivating members 56 are positively rotated in the directions that are indicated by arrows in FIG. 5 by the drive that is derived from the power take-off shaft of the agricultural tractor or other vehicle which moves and operates the implement. The tines 57 of the members 56 are arranged to work overlapping strips of soil so that, in effect, the implement works a single broad strip of land. Once again, the resilient elongated elements 39 work the soil immediately in advance of the members 56 throughout the working width of those members and co-operate with them in greatly reducing, if not substantially completely preventing, undesired lateral displacement of the soil that is moved by the tines 57 of the members 56. The soil crumbling members 76 of FIGS. 5 and 6 of the drawings, or the soil crumbling members 77 of FIGS. 7 and 8 of the drawings, co-operate with the tops of the soil working or cultivating members 56 and bring the soil displaced by those members to a well crumbled condition. In the case of the soil crumbling members 76 that are illustrated in FIGS. 5 and 6 of the drawings, those members 76 are provided in pairs in which the two members of each pair abut against one another throughout initial portions of their lengths commencing from their fastening points. This contruction and arrangement gives the spaced effective portions of the two members 76 of each pair a somewhat greater stiffness than would otherwise be obtained and this, particularly when heavy soil is being worked, results in an improved co-operation between the effective portions of the members 76 and the tops of the soil working or cultivating members 56. The effective portions of both the soil crumbling members 76 and 77 are of resilient construction and mounting and are thus capable of deflecting readily in the event of impacts against stones and the like thus making damage to them from such causes a very infrequent occurrence.

The soil cultivating implement that is illustrated in FIGS. 9 to 20 comprises a frame portion 81 of sheet material having a substantially U-shaped cross-section. The frame portion 81 supports a plurality of cultivating members 83 adapted to rotate about upwardly extending, preferably vertical shafts 82. The shafts 82 of the respective cultivating members 83 are supported in two upwardly spaced apart bearings 84 in a bearing housing 85. The two bearings 84 engage, on the bottom and top sides respectively, a collar 86 on the inner side of the bearing housing 85. The top bearing 84 is held in place by a nut 87 screwed onto a screwthreaded part of the shaft 82. Sealing material is arranged between the nut 87 and the bearing 84. The lower bearing 84 co-operates with the lower side of a collar 88 on the shaft 82, said collar being held in place by means of a locking ring 89 and a hub 90 of a support 91 of a cultivating member 83. The locking ring 89 closes the bottom side of the bearing housing 85. The bearing housing 85 for a shaft 82 is supported by the frame portion 81 in a manner to be discussed hereinafter. The frame portion 81 comprises a chamber 92 and a trough 93 located beneath the former, whose longitudinal centre lines extend at least substantially in a horizontal direction and parallel to one another. The chamber 92 has a substantially rectangular cross-section, whereas the trough 93 has a substantially triangular cross-section, the broadest part facing the chamber. The chamber 92 comprises an upper and a bottom wall of sheet material. The upper wall comprises a horizontal portion merging at the front and at the rear into identical longitudinal sides bent over downwardly. Each of these longitudinal sides terminate in an at least substantially horizontal clamping rim 94 covering the whole length of the frame portion. The bottom wall of the chamber 92 comprises an at least substantially horizontal portion merging at the front and at the rear into upward, identical longitudinal sides covering a distance substantially equal to the distance covered by the longitudinal sides of the upper wall. Each of said longitudinal sides terminates in a horizontal clamping rim 95. The wall of the trough 93 has a horizontal central portion changing at the front and at the rear into an upward, inclined portion bent over at the level of the bottom wall of the chamber 92 by a portion engaging the longitudinal side of the bottom wall. The bent-over portion terminates in a clamping rim 96. The rims 94 and 95 the upper and bottom walls of the chamber 92 are clamped together by means of bolts 97. Sealing material 98A of a hard synthetic material is interposed between the rims 94 and 95. Said material has the shaped of a strip with rims afforded by thickened parts. The inner rim of a strip is hollow and engages the inner side of the longitudinal sides of the upper and bottom walls of the chamber, whereas the outer rim of the strip is solid and engages the outer side of the rims 94 and 95. On the engaging side the outer rim of the strip is flat, while it is rounded off on the outer side. The rim 96 of the bottom wall of the trough 93 constitutes a support for the chamber 92 and can be secured to the rims 94 and 95 by means of bolts alternating with the bolts 97. For passing the bolts 97 the rim 96 has apertures receiving nuts co-operating with the bolts. The bottom wall of the chamber 92 and the wall of the trough 93 have circular openings facing each other, so that the centers of said openings are at a distance of about 37.5 cms from one another. In the registering openings the bearing housings 85 with the shafts 82 of the respective cultivating members 83 are brought by slipping them from below into the frame portion 81. By means of a flange 98 on the bottom side each bearing housing 85 engages the bottom side of the straight portion of the trough 93, to which it can be secured by means of bolts 99, the bolts 99 are arranged on a ring 100 surrounding the bearing housing 85. The top side of the bearing housing 85 extends into the chamber 92 and it has a narrowed portion near the top, which is adapted to co-operate with a ring 101 fitting around said part and having, on the side of the bearing housing 85, a rim extending into the opening and being fastened to the bottom wall of the chamber 92 by means of bolts 102. Sealing material is provided between the ring 101 and the bottom wall of the chamber 92. Further sealing material is arranged in an uninterrupted recess in the narrowed part of the bearing housing 85 so that an effective seal is obtained for the lubricant in the chamber 92. The top end of each shaft 82 in the chamber 92 is provided with a gear wheel 104 having a diameter of about 37.5 cms. The gear wheels 104 on the shafts 82 of two adjacent cultivating members 83 are drivably in mesh with one another. From FIG. 10 it will be seen that at the level of the ends of the shafts the upper wall of the chamber 92 has a depression 105 extending to near the upper end of a shaft 82 and the upper end of the hub of the gear wheel 104 arranged at the upper end of the shaft. This depression 105 constitutes a stop for the bearing housings 85 and the shafts 82 when these are slipped from below into the trough 93. The end of each shaft 82 projecting from the bottom side of the trough is provided with a support 91 of a cultivating member 83. The support 91 comprises a central hub 90, which is splined to the end of the shaft 82, said hub being surrounded at its upper end by a ring 106, which is located, when the support is secured in place, within a bent-over rim 107 of the flange 98. On the bottom side the hub 90 has a recess joined by a downwardly extending rim 108 and receiving a locking ring 109, which is held in place by means of a bolt 110, screwed into the end of the shaft 82. The ends of the support 91 are bent over downwardly and constitute a stub shaft 112 located beneath a collar 111. A support 113 of a cultivating tool 114 is freely rotatable about the stub shaft 112. The support 113 comprises three arms tapering away from a hub 115 towards their ends, where they are provided with an upwardly tapering holder 116 for a downwardly extending tine 117. The hub 115 of each support 113 is freely rotatable about a stub shaft 112 by means of two relatively spaced bearings 118. The bearings 118 are supported from a collar 119 on the inner side of the hub 115. Sealing material is arranged between the upper bearing 118 and the collar 119 above the stub shaft 112. The hub 115 of a support is held in place by means of a fitting piece 120, a narrowed portion of which engages the lower bearing 118, while it closes the bottom side of the hub by a widened portion. The fitting piece 120 is held in place by a bolt 121, which is screwed into the lower side of the stub shaft 112, its head being located in a countersunk part of the fitting piece 120. From FIG. 10 it will be seen that the upper side of the hub 115 of the support 113 surrounds the collar 111 located above the stub shaft 112. Each of the holders 116 receives the fastening portion 122 of a downwardly extending tine 117. The fastening portion 122 has, from its junction with the operative portion 123, a tapering portion 124 terminating in a srewthreaded, cylindrical portion 125. The tapering portion 124 has a quadrangular, preferably square cross-section and is provided between the sides of the cross-section with uniform, shallow hollowed parts. In fastening the tine 117 the quadrangular, upwardly tapering fastening portion 122 cooperates with the correspondingly shaped inner side of the holder 116 and by means of a nut 126 screwed onto the screwthreaded portion 125 it is secured in place. The lower side of the nut 126 co-operates with a slightly conical, inwardly extending top side of the holder 116. The operative portion 123 of a tine 117 has a restricted portion extending away from the junction with the fastening portion 122 and initially having a square cross-section changing into a portion having at least substantially a circular cross-section (FIG. 17) changing towards the free end into an angular cross-section so that towards the free end the operative portion assumes the shape of a wedge. Away from the circular section portion a ridge 127 is initially provided and further away there is an opposite ridge 127A, the corners of the cross-section located near the end between the ridges being rounded off. The sides between the rounded-off corners and the ridges 127 and 127A have a cavity 128, which extends from the free end upwardly.

The longitudinal center line of the operative portion 123 of a tine 117 is at angle of preferably 8° to the longitudinal center line of the fastening portion 122. The line of connection between opposite ridges 127 and 127A of the operative portion is at least substantially tangential to the rotary axis of a cultivating tool 114 formed by the longitudinal center line of a stub shaft 112. At the free end of the operative portion 123 the distance between two ridges 127 and 127A is about twice the radial distance between the rounded-off corners. Each holder 116 is provided at the top with a circular protective member 129 covering about 180° and extending at least to near the tops side of a nut 126, which is thus protected in operation against stones and the like.

The sides of the frame portion 81 are provided with upwardly extending plates 130, extending in the direction of movement A. The plates 130 are provided near the front with a stub shaft 131, about which is pivotable an arm 132 that extends rearwardly along the plates. Between their ends the arms 132 hold by means of stub shafts 133 a supporting member 134, extending transversely of the direction of travel A and formed by a roller. The roller 134 comprises in between plate-shaped supports 135 with the respective stub shafts 133, equidistant plate-shaped supports 136. The plate-shaped supports 135 and 136 are welded to eight tubular elongated elements 137. The elongated elements 137 constitute the sole connection between the supports 135 and 136. The arms 132 for the supporting member 134 can be set in a plurality of positions by means of a bolt 138, which can be passed through a hole in an arm and through one of a plurality of holes in the rear parts of the plates 131. On the upper side the frame portion 81 is provided with supports 139 extending in the direction of travel A and being secured by means of ears 140 to the rims 94 of the upper wall of the chamber 92 with the aid of the bolts 97, which also secure the rims 94 and 95.

On the distal sides the supports are provided with tags 141, between which are arranged arms 143, by means of pins 142 whose longitudinal center lines are in line with one another and extend in the direction of travel A. The arms 143 are bent over downwardly beyond the frame portion 81 and are secured to the upper side of a plate 144A, which extends in the direction of travel A. From FIG. 9 it will be apparent that the arms 143 are slightly coverging away from their pivotal joints. The arms 143 are each secured to a bent-over upper rim of the plate 144A, which slides over the ground during operation by a bent-over lower rim. At the front the bent-over rim of the plate extends at least substantially vertically over a given distance and changes into the lower rim via a downwardly and rearwardly inclined portion. On the rear side of the lower rim initially rises upwardly and changes via an at least substantially vertical portion into the upper rim of the plate.

At the front, at the level midway between two shafts of cultivating members 83 which move rearwardly on their proximal sides during operation, the rim 96 of the trough 93 is provided with supports 144, which extend along the part of the trough 93 engaging the rim 96 in downward direction and are then bent over rearwardly at the level of the bottom side of the trough, while bearing on the bottom side. The foremost, downwardly extending part of the supports 144 is provided by means of bolts 145 with plate-shaped crumbling members 146 of spring material, preferably spring steel. The crumbling members 146 are tapering towards their free ends and initially extend in line with the front side of the support 144, after which they terminate in a straight, downwardly and rearwardly inclined portion extending up to a plane through the rotary axes of the cultivating members 83. Said member has a straight end, which is at least substantially parallel to the plane through the rotary axes of the cultivating members 83 (see FIG. 9).

FIG. 10 shows that the free end of the plate-shaped crumbling member 146 is located on level with the end of a shaft 82 of a cultivating member 83 and on level with a support 113 of a rotor 114.

Near the center the frame portion 81 is provided with a gear box 147 by means of bolts 147A and ears 147B on supports 138 extending in the direction of travel A and having a U-shaped cross-section and arraged between angle-section irons 169A and 150A secured to the front and rear sides of the rims 114 of the upper wall of the trough 93, the upwardly extending limbs thereof inclined to the rear (see FIG. 10). The gear box 147 comprises a housing formed from two portions 149 and 150. The lower portion 150 is directly secured to the upper side of the chamber 92. On the upper side the portion 150 is open and along the rim it is provided with an uninterrupted flange 151 supporting the upper portion 149 by means of a flange 148A, the connection being established by bolts 152. The portion 149 of the gear box is closed on its upper side and partly open on the bottom side so that an open communication is established between the portions 149 and 150. The portion 149 has a bearing housing 153 on the front side, viewed in the direction of travel A, said housing accommodating two relatively spaced bearings 154 and 155, whose inner rings support an input shaft 156. The shaft 156 has splines at the front outside the bearing housing 153 and fitting to splines at one end of an auxiliary shaft, which can be coupled with the power take-off shaft of a tractor. At the rear end the shaft 156 also has splines located inside the gear box 147 and serving for fixing a bevel gear wheel 157. The upper side of the portion 149 of the gear box 147 is formed by a wall joining at the front the bearing housing 153 and terminating at the rear in a wall portion rearwardly and downwardly inclined at an angle of about 60° to the horizontal plane, the lower side joining the flange 148A.

The open bottom side of the portion 149 includes two circular holes 158 and 159, whose center lines are parallel to the center lines of the rotor shafts 82. The edges of the two holes 158 and 159 constitute holders for bearings 160 and 161 located one behind the other, viewed in the direction of travel A. The foremost bearing 160 supports a driving shaft 162, whose center line coincides with the center line of the foremost hole 158. The driving shaft 162 projects over part of its length above the bearing 160 and has along said part external, splines for fastening a bevel gear wheel 163 on the shaft. The center line thereof intersects the center line of the input shaft 156 at right angles. The bevel gear wheel 163 is directly in mesh with the bevel gear wheel 157 on the input shaft 156. The driving shaft 162 projects by about 60% of its overall length beneath the bearing 160 and has over part thereof an external toothing 162A around the circumference in the axial direction. Between the splines securing bevel gear wheel 163 on the shaft 162 and the external toothing 162A the shaft 162 has a smooth outer surface. This part bears on the inner ring of the bearing 160. Beneath the external toothing 162A the shaft 162 has an end portion serving as a stub shaft also having a smooth outer surface. This stub shaft is located in a bearing 164 in a bearing housing 165 arranged in the lower wall of the lower portion 150 of the gear box 147. With the aid of the external toothing 162A three straight gear wheels 166, 167 and 168 are fastened one above the other to the driving shaft 162. The central gear wheel 167 has pitch circle exceeding that of the upper gear wheel 166, whereas the lower gear wheel 168 has a pitch circle exceeding that of the central gear wheel 167. The thicknesses of the respective gear wheel 166 to 168 decreases from the top to bottom. The diameter of the pitch circle of the upper gear wheel 166 amounts to 60 to 70% of that of the central gear wheel 167, whereas the diameter of the pitch circle of the lower gear wheel 168 is 150 to 160% of that of the upper gear wheel 166. The gear wheels 166 to 168 have a hole at the center, bounded by inner toothing in axial directions, fitting to the external toothing 162A of the shaft 162. Between the respective gear wheels 166 to 168 are arranged spacer rings 169 also fitting to the toothing 162A. Behind the driving shaft 162 a side shaft 170 is supported near its top end by a bearing 161 and furthermore by bearings 171 and 171A surrounding the lower part of the shaft. The central bearing 171 is arranged in a bearing housing 172, which is secured in the top wall of the chamber 92. The central bearing 171 is located just beneath the bearing 164. The distance between the bearings 171 and 171A is about 15 to 20% of the overall length of the shaft 170. The bearing 171A is arranged in a bearing housing 173, which is supported from the bottom wall of the trough 93. The bearing 171A is located at the level of the bottom wall of the chamber 92. The overall length of the shaft 170 is about 1/16-th times that of the shaft 162 and the top head faces of said shafts are located approximately at the same level. A top portion 174 of the shaft 170, serving as a stub shaft, is surrounded by an annular setting member, the bore of which intimately holds the stub shaft 174, said member having on the outer side unintterupted flanges 176, which are spaced apart in an axial direction. The setting member 175 is secured to the shaft 170 by means of a pin 176A passing through said setting member and the stub shaft 174. A side of the portion 149 of the gear box 147 is provided with a pivotal shaft 177, to which is secured a lever 178 located outside the gear box, said shaft holding in addition an arm 179 located inside the gear box 147. The arm 179 is provided at its end remote from the pivotal shaft 177 with a lug or roller 180, which is located inside the groove formed by the two annular flanges 176 of the setting member 175. The lever 178 is adapted to move along a locking plate 181 located outside the box 147 and having the shape of a part of the arc of a circle, said plate having a plurality of notches for receiving the lever. The lever 178 is held by spring pressure in a manner not shown in the selected notch. This spring pressure may be obtained by fastening the whole locking plate in a resilient manner to the gear box 147 or by using a resilient lever. The portion of the side shaft 170 joining the setting member 175 and the bearing 161 is surrounded by three straight gear wheels, 182, 183 and 184 so that the gear wheel 182 is constantly in mesh with the gear wheel 166, the gear wheel 183 with the gear wheel 167 and the gear wheel 184 with the gear wheel 168. The diameter of the pitch circle of the gear wheel 184 is equal to that of the gear wheel 166, that of the gear wheel 183 is equal to that of the gear wheel 167 and that of the gear wheel 182 is equal to that of the gear wheel 168. The thicknesses of the gear wheels 166, 182, 167, 183 and 168, 184 respectively, measured parallel to the center lines, are substantially equal. The gear wheels 182 and 183 have on the bottom side and near the shaft 170 an annular bulging part, the lower head face of which is in supporting engagement with the lower gear wheel 183 and 184 respectively. The gear wheel 184 not having such a bulging part engages by its bottom surface a lug 185 forming part of a bottom portion of the portion 150 of the gear box 147. The set of three gear wheels 182 to 184 is enclosed in the direction of the shaft 170 via the lug 185 and the rings 186 located between a circlip 187 and the top surface of the gear wheel 182 by the top portion 149 of the gear box 147. The gear wheels 182 to 184 have each an inner toothing surrounding the shaft 170. These toothings extend parallel to the center line of the shaft 170. The inner toothing of the gear wheel 182 covers, however, only part of the thickness of the gear wheel, so that part of the central bore of the gear wheel 182 is free of inner toothing. At this place the gear wheel 182 has a bore receiving the side shaft 170 with ample clearance. In a similar manner the gear wheel 183 has inner toothing over part of its thickness, the further part not having inner toothing and surrounding the side shaft 170 with ample clearance. The gear wheel 184 also has inner toothing over part of the bore receiving the side shaft 170, the further part of the bore not having toothing and surrounding the shaft 170 with ample clearance. The inner toothing of the gear wheels 182 to 184 are identical and the dimensions of the portions without toothing are also the same, the height corresponding approximately with the height of the inner toothing and of the gear wheels. The portion of the gear wheel 182 without toothing is located between the rings 186 and the inner toothing. The part of the gear wheel 183 without inner toothing is located between the inner toothing of the gear wheel 182 and the inner toothing of the gear wheel 183, whereas the part of the gear wheel 184 without inner toothing is located between the inner toothing of the gear wheel 183 and the inner toothing of the gear wheel 184 itself. The heights of the parts without inner toothing, measured in an axial direction, are the same. The side shaft 170 has an outer toothing 188 extending in an axial direction. The height of the toothing 188 of the side shaft 170, measured in an axial direction, is at the most equal to the height of the parts of the gear wheels 182 to 184 without toothing. The external toothing 188 is located in an axial direction at such an area of the side shaft 170 that it is in mesh with the inner toothing of the lower gear wheel 184, when the lower part of the setting member 175 engages the top side of the bearing 161. The lower end of the side shaft 170 is surrounded by a sleeve 189 journalled by the bearings 171 and 171A and being provided between said bearings with an external toothing 190, which is constantly in mesh with one of the two adjacent gear wheels 104 in the chamber 92. The sleeve 189 has inner toothing throughout its height, which is constantly in mesh with a straight, external toothing 191 on the circumference of the side shaft 170. The part of the circumference of the shaft 170 with the toothing 191 is located at such a distance from the area of the external toothing 188 that, when the toothing 188 is moved to the part of the gear wheel 182 without toothing the toothing 191 is still in mesh with the top part of the inner toothing of the sleeve 189. The height of the external toothing 191, measured in an axial direction, is approximately equal to the height of each of the parts of the gear wheels 182 to 184 without toothing, also measured in an axial direction. On either side of the gear box 147 the top side of the trough 93 is provided by means of ears 192 fastened to the respective rims with supports 193 extending in the direction of travel A. At the front a hitch 194 is secured to the supports 193, the top side of said hitch being connected with the rear sides of the supports 193 by means of downwardly inclined, rearwardly diverging struts 195.

During operation the machine is coupled by means of the hitch 194 with the three-point lift of a tractor and the front end of the shaft 156 projecting from the front of the gear box 147 is connected through an auxiliary shaft with the power take-of shaft of the tractor. During the movement in the direction of the arrow A the respective cultivating members 83 are driven in the directions indicated by the arrows in FIG. 9 through the transmission gear described above. During the rotation of the cultivating members 83 the respective cultivating tools 114 of the cultivating members are caused to move by the contact of the tines 137 with the ground in the directions indicated by arrows in FIG. 9. The operative portions 123 of the tines 117 are in a trailing position with respect to said rotation. The tines 117 of the cultivating tools 114 work overlapping strips of soil of a width of about 30 cms with a distance between the respective shafts of the cultivating members of about 37.5 cms so that an uninterrupted strip of soil is tilled. With the aid of the protective or screening members 129 on the holders 116 the nut connections of the tines can be protected against stones and similar hard objects, while the ring 106 on the top side of the hub 90 of each rotor arm 91 and the downwardly extending rim 107 of the flange 98 on the lower side of the bearing housing 85 prevent material from winding around the fastening bolts 100 of the bearing housing. During the movement of the machine an intensive co-operation is ensured between the respective plate-shaped crumbling members 146 of spring material located in between the cultivating members and the upper sides of the cultivating tools 114, so that the soil thrown up by the cultivating tools is drastically crumbled up, the earth being conducted to the rear along the plate-shaped members 146 between the relatively co-operating cultivating members 83. The plates 146 of resilient material constitute, in addition, flexible guides for any stones, which are pushed away along the plates in a downwardly inclined direction, so that they can disappear between the cultivating members 83 into the subsoil. Instead of using separate supports 144, a single support may be employed, which covers the whole length of the frame portion, said support being preferably strip-shaped so that it constitutes during operation in addition an ideal guide member for the earth and the hard objects contained therein, while it provides also a given degree of levelling. With the aid of the supporting member 134 in the form of a roller held by the arms 132 and adapted to be set in a plurality of positions the working dept of the tools 114 of the respective cultivating members 83 can be adjusted in operation, while said supporting member provides a further crumbling and a uniform distribution of the earth worked by the respective cultivating tools. As stated above the respective cultivating members 83 are driven through the transmission described above. The auxiliary shaft is connected with the key ways of the input shaft 156. The rotary movement of the shaft 156 is transferred by means of the bevel gear wheels 157 and 163 of identical structure into a rotary movement of the driving shaft 162. Since the gear wheels 166, to 168 are in mesh with the external toothing 162A of the shaft 162 these three gear wheels constantly rotate with the shaft 162 so that the three gear wheels 182 to 184, being constantly in mesh with the gear wheels 166 to 168 are also constantly driven. However, in the position shown in FIG. 10, one of the gear wheels i.e., the gear wheel 184 is coupled with the side shaft 170, since the external toothing 188 of the side shaft 170 is in mesh with the inner toothing of the gear wheel 184. The driving torque transmitted by the gear wheels 167 and 168 to the side shaft 170 is transmitted to the rotary shaft 82 of a cultivating member 83 by means of the external toothing 191 of the shaft 170, the inner toothing of the sleeve 189, the external toothing of the sleeve 189 and the toothing of one of the adjacent gear wheels 104 in mesh herewith. With regard to a different kind of soil or to other conditions it may be desirable to impart a different speed of rotation to the respective cultivating members 83. On heavy soil a satisfactory crumbling can be obtained by driving the cultivating members with a higher speed, whereas on a light soil a lower speed may have a favourable effect. In this case the lever 178 is moved downwards along the locking plate 181 so that the roller 180 moves upwards and the force exerted on the flange 176 of the setting member 95 displaces the shaft 170 upwardly in an axial direction. In this case the external toothing 188 is disengaged from the inner toothing of the gear wheel 184, while the external toothing 188 gets at the part of the gear wheel 184 without inner toothing. In this case a free run is obtained, in which the cultivating members 83 are standing still, while the input shaft 156 is driven. When the lever 178 is further moved downwards along the locking plate 181, the toothing 188 comes into mesh with the inner toothing of the gear wheel 183 so that the gear wheel 183 is fixed for rotation with the shaft 170. In this case the driving torque is transferred through the driving shaft 162 and the gear wheel 167 to the gear wheel 183, the shaft 170 thus rotating with a different speed, while the number of revolutions of the input shaft 156 remains the same. The gear wheels 182 and 184 are in this case not connected with the shaft 170 and are driven by the gear wheels 166 and 168 respectively, while they freely rotate about the shaft 170. The contact face between the gear wheels freely rotating about the shaft 170 is formed by the furthest inner boundary faces of the inner toothings of the gear wheels concerned, said boundary faces intimately fitting around the locally smooth outer surface of the shaft 170. When the lever 178 is further moved downwards, the external toothing 188 arrives at the portion of the gear wheel 183 without toothing, so that it can run freely, while upon a further displacement of the shaft 170 in an upward direction the external toothing 188 engages the inner toothing of the gear wheel 182, which then transfers the driving torque to the shaft 170, the gear wheels 183 and 184 rotating loosely about the shaft 170. Upon a further upward displacement of the shaft 170, the external toothing 188 will engage the part of the gear wheel 182 without toothing so that again a free run is obtained. In the latter position the external toothing 191 is still in mesh with the inner toothing of the sleeve 189, that is to say with the upper part of said toothing. The presence of the parts without inner toothings prevents the external toothing 188 from simultaneously engaging the inner toothings of two different gear wheels. If the driving torque is transferred through the gear wheels 166 and 182, the shaft 170 of this embodiment rotates with a speed of about 0.64 times the speed of the shaft 162. If the gear wheels 167 and 183 transfer the torque, the speeds of the shafts 162 and 170 are the same, whereas at a transfer of the torque by the gear wheels 168 and 184 the shaft 170 of this embodiment is driven with a speed equal to about 1.57 times that of the shaft 162. If the shaft 170 is driven with a higher speed, while the speeds of the shafts 156 and 162 remain the same, the transmitted torque is smaller for the same power so that the gear wheels 167, 183, 168, 184 respectively may be thinner than the upper gear wheels. With the construction described the number of required parts for the adjustment of different rotor speeds is minimized, while in contrast to relatively displaceable gear wheels each of the teeth is not likely to be damaged during a changeover, such damages becoming every time more serious in operation, since the teeth have to move constantly with respect to co-operating teeth.

The construction described above provides a very effective soil cultivating implement, which with a minimum of cultivating members has a maximum working width while the co-operation of the pairs of cultivating tools with the intermediate crumbling members 146 of resilient material ensures an intensive crumbling even of heavy soil. The side plates 144A movable in a direction of height prevent at the ends of the strip of soil that the earth is crumbled up in a different manner than further to the center, while accumulations of earth in the direction of movement are avoided.

The invention is not limited to the foregoing but also relates to all details of the Figures, whether described or not described.

What we claim is:

1. A soil cultivating implement comprising a frame and a plurality of rotatable soil cultivating members arranged in a transverse row with respect to the normal direction of travel, said members being journalled along the length of an elongated portion of said frame and said frame portion also extending transverse to the direction of travel, said cultivating members being mounted on corresponding upwardly extending shafts and driving means connected to rotate those members about axes defined by said shafts, each cultivating member comprising a substantially horizontal support and spaced apart groups of tines being mounted on said support so as to be freely rotatable about corresponding upwardly extending axes, the paths of soil worked by the tines of two neighboring cultivating members exceeding the distance between the respective axes of rotation of said cultivating members, at least one soil crumbling member mounted on the implement and said crumbling member having a generally horizontal resilient active portion located substantially midway between said two neighboring cultivating members, said active portion being located above said groups and adjacent the supports of said neighboring members, the active portions of the crumbling members extending rearwardly of a plane that passes through the foremost paths of said tine groups.

2. A soil cultivating implement as claimed in claim 1, wherein said crumbling member is interconnected to the frame in front of said cultivating members and said active portion converging rearwardly between said two neighboring cultivating members.

3. A soil cultivating implement as claimed in claim 1, wherein a rear free end of the active portion of said crumbling member extends rearwardly at least to a plane that passes through the rotary axes of said two cultivating members, said two members being driven in relative opposite directions to move soil between them.

4. A soil cultivating implement as claimed in claim 1, wherein said shafts are mounted in a row and said crumbling member has a rear free end that is flat, said end extending at least to a plane that passes through said shafts.

5. A soil cultivating implement as claimed in claim 1, wherein said crumbling member is connected to said frame portion and said active portion is resiliently mounted with respect to said frame portion.

6. A soil cultivating implement as claimed in claim 1, wherein said crumbling member comprises two parts made from a single length of resilient material and said parts are located one above the other.

7. A soil cultivating implement as claimed in claim 1, wherein said crumbling member is comprised by resilient material having a circular cross-section.

8. A soil cultivating implement as claimed in claim 7, wherein said crumbling member comprises two spaced apart pairs of tines of resilient material.

9. A soil cultivating implement as claimed in claim 1, wherein said crumbling member is mounted on a strip-shaped supporting member that is secured to said frame portion.

10. A soil cultivating implement comprising a frame and a plurality of rotatable soil cultivating members arranged in a transverse row with respect to the normal direction of travel, said members being journalled along the length of an elongated portion of said frame and said frame portion also extending transverse to the direction of travel, said cultivating members being mounted on corresponding upwardly extending shafts and driving means connected to rotate those members about axes defined by said shafts, each member comprising a substantially horizontal support and downwardly extending tines, the paths of soil worked by tines of neighboring cultivating members during operation, exceeding the distance between the respective axes of rotation of said members, at least one soil crumbling member mounted on the implement and said crumbling member having a generally horizontal active portion located substantially midway between two neighboring cultivating members, said active portion extending above said tines and the soil being worked by the tines when viewed from the side, said active portion being located adjacent the supports of said neighboring members, substantially in line with the overlapping paths worked by those members, said crumbling member being resilient and extending rearwardly at least to a plane that passes through the rotary axes of the two neighboring members.

11. A soil cultivating implement as claimed in claim 10, wherein said crumbling member has upper and lower surfaces.

* * * * *